US011652267B2

(12) United States Patent
Madsen et al.

(10) Patent No.: US 11,652,267 B2
(45) Date of Patent: May 16, 2023

(54) PHASED ARRAY ARCHITECTURE WITH DISTRIBUTED TEMPERATURE COMPENSATION AND INTEGRATED UP/DOWN CONVERSION

(71) Applicant: Anokiwave, Inc., San Diego, CA (US)

(72) Inventors: Kristian N. Madsen, Napa, CA (US); Robert J. McMorrow, Concord, MA (US); David W. Corman, Gilbert, AZ (US); Nitin Jain, San Diego, CA (US); Robert Ian Gresham, San Diego, CA (US); Gaurav Menon, San Marcos, CA (US); Vipul Jain, Irvine, CA (US); Jonathan P. Comeau, San Diego, CA (US); Shmuel Ravid, San Diego, CA (US)

(73) Assignee: Anokiwave, Inc., San Diego, CA (US)

( * ) Notice: Subject to any disclaimer, the term of this patent is extended or adjusted under 35 U.S.C. 154(b) by 147 days.

(21) Appl. No.: 17/369,557

(22) Filed: Jul. 7, 2021

(65) Prior Publication Data
US 2021/0344099 A1 Nov. 4, 2021

Related U.S. Application Data

(63) Continuation of application No. 16/375,251, filed on Apr. 4, 2019, now Pat. No. 11,063,336.
(Continued)

(51) Int. Cl.
*H01Q 1/02* (2006.01)
*H01Q 3/28* (2006.01)
(Continued)

(52) U.S. Cl.
CPC ............. *H01Q 1/02* (2013.01); *H01Q 3/2605* (2013.01); *H01Q 3/28* (2013.01); *H01Q 21/00* (2013.01);
(Continued)

(58) Field of Classification Search
CPC .......... H01Q 1/02; H01Q 3/28; H01Q 21/065; H01Q 21/06; H01Q 21/0025; H01Q 21/00; H04B 7/0617; H04B 7/06
(Continued)

(56) References Cited

U.S. PATENT DOCUMENTS

2017/0033458 A1* 2/2017 Haziza ..................... H01Q 1/28
2018/0062274 A1* 3/2018 Madsen .................. H01Q 3/24
(Continued)

*Primary Examiner* — Hai V Tran
(74) *Attorney, Agent, or Firm* — Nutter McClennen & Fish LLP

(57) ABSTRACT

A conditioning integrated circuit (CDIC) chip can be used to aggregate signals to/from a number of beam forming integrated circuit (BFIC) chips, and signals to/from a number of CDIC chips can be aggregated by an interface integrated circuit (IFIC) chip. The CDIC chip includes temperature compensation circuitry to adjust the gain of the transmit and receive signals as a function of temperature based on inputs from a temperature sensor. The CDIC may include a plurality of beam forming channels each having a transmit circuit and a receive circuit, a common port coupled to the beam forming channels for selectively providing a common transmit signal to the beam forming channels and receiving a common receive signal from the beam forming channels, and a temperature compensation circuit configured to provide variable attenuation to the common transmit signal and the common receive signal based on a temperature sense signal.

20 Claims, 22 Drawing Sheets

Related U.S. Application Data

(60) Provisional application No. 62/653,050, filed on Apr. 5, 2018.

(51) Int. Cl.
*H01Q 21/06*   (2006.01)
*H01Q 21/00*   (2006.01)
*H04B 7/06*    (2006.01)
*H01Q 3/26*    (2006.01)
*H01Q 1/22*    (2006.01)

(52) U.S. Cl.
CPC ......... *H01Q 21/0025* (2013.01); *H01Q 21/06* (2013.01); *H01Q 21/065* (2013.01); *H04B 7/06* (2013.01); *H04B 7/0617* (2013.01); *H01Q 1/2283* (2013.01)

(58) Field of Classification Search
USPC ........................................................ 343/904
See application file for complete search history.

(56) References Cited

U.S. PATENT DOCUMENTS

2019/0089402 A1* 3/2019 Zihir ........................ H04B 1/44
2020/0350677 A1* 11/2020 Jain ......................... H01Q 3/26

* cited by examiner

FIG. 9

PHASED ARRAY ARCHITECTURE WITH DISTRIBUTED TEMPERATURE COMPENSATION AND INTEGRATED UP/DOWN CONVERSION

CROSS-REFERENCE TO RELATED APPLICATION(S)

This patent application is a continuation of U.S. patent application Ser. No. 16/375,251 entitled Phased Array Architecture with Distributed Temperature Compensation and Integrated Up/Down Conversion filed Apr. 4, 2019 (U.S. Pat. No. 11,063,336 issued Jul. 13, 2021), which claims the benefit of U.S. Provisional Patent Application No. 62/653,050 entitled Phased Array Architecture with Distributed Temperature Compensation and Integrated Up/Down Conversion filed Apr. 5, 2018, each which is hereby incorporated herein by reference in its entirety.

The subject matter of this patent application may be related to the subject matter of U.S. patent application Ser. No. 15/267,689 entitled LAMINAR PHASED ARRAY ANTENNA filed Sep. 16, 2016, which is hereby incorporated herein by reference in its entirety.

The subject matter of this patent application may be related to the subject matter of U.S. patent application Ser. No. 15/253,426 entitled PHASED ARRAY CONTROL CIRCUIT filed Aug. 31, 2016, which is hereby incorporated herein by reference in its entirety.

The subject matter of this patent application may be related to the subject matter of U.S. Patent Application No. 62/479,823 entitled APPARATUS AND METHOD FOR RF ISOLATION IN A PACKAGED INTEGRATED CIRCUIT filed Mar. 31, 2017, which is hereby incorporated herein by reference in its entirety.

The subject matter of this patent application also may be related to the subject matter of U.S. patent application Ser. No. 15/267,704 entitled LAMINAR PHASED ARRAY WITH POLARIZATION-ISOLATED TRANSMIT/RECEIVE INTERFACES filed Sep. 16, 2016, which is hereby incorporated herein by reference in its entirety.

The subject matter of this patent application may be related to the subject matter of U.S. patent application Ser. No. 15/475,246 entitled ATTENUATION CIRCUIT AND METHOD OF CONTROLLING AN ATTENUATION CIRCUIT filed Mar. 31, 2017, which is hereby incorporated herein by reference in its entirety.

The subject matter of this patent application may be related to the subject matter of U.S. patent application Ser. No. 15/938,647 entitled APPARATUS AND METHOD FOR RF ISOLATION IN A PACKAGED INTEGRATED CIRCUIT filed Mar. 28, 2018, which is hereby incorporated herein by reference in its entirety.

The subject matter of this patent application may be related to the subject matter of U.S. Patent Application No. 62/639,639 entitled PHASED ARRAY WITH LOW-LATENCY CONTROL INTERFACE filed Mar. 7, 2018, which is hereby incorporated herein by reference in its entirety.

FIELD OF THE INVENTION

The invention generally relates to phased arrays and, more particularly, the invention relates to a phased array control circuit.

BACKGROUND OF THE INVENTION

Active electronically steered antenna systems ("AESA systems," a type of "phased array system") form electronically steerable beams for a wide variety of radar and communications systems. To that end, AESA systems typically have a plurality of beam forming elements (e.g., antennas) that transmit and/or receive energy so that the signal on each beam forming element can be coherently (i.e., in-phase and amplitude) combined (referred to herein as "beam forming" or "beam steering"). Specifically, many AESA systems implement beam steering by providing a unique RF phase shift and gain setting (phase and gain together constitute a complex beam weight) between each beam forming element and a beamforming or summation point.

The number and type of beam forming elements in the phased array system can be selected or otherwise configured specifically for a given application. A given application may have a specified minimum equivalent/effective isotropically radiated power ("EIRP") for transmitting signals. Additionally, or alternatively, a given application may have a specified minimum G/T (analogous to a signal-to-noise ratio) for receiving signals, where:

G denotes the gain or directivity of an antenna, and
T denotes the total noise temperature of the receive system including receiver noise figure, sky temperature, and feed loss between the antenna and input low noise amplifier.

One issue in a typical phase array system is that gain can vary according to temperature. For example, when temperature decreases, the gain generally increases, and when temperature increases, the gain generally decreases. These temperature-dependent gain changes can affect performance of the phased array system including, among other things, power consumption.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing a pinout for the BFIC chip, in accordance with a second exemplary embodiment.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Definitions

As used in this description and the accompanying claims, the following terms shall have the meanings indicated, unless the context otherwise requires:

A "set" includes one or more members.

A "beam forming element" (sometimes referred to simply as an "element" or "radiating element") is an element that is used to transmit and/or receive a signal for beam forming.

Different types of beam forming elements can be used for different beam forming applications. For example, the beam forming elements may be RF antennas for RF applications (e.g., radar, wireless communication system such as 5G applications, satellite communications, etc.), ultrasonic transducers for ultrasound applications, optical transducers for optical applications, microphones and/or speakers for audio applications, etc. Typically, the signal provided to or from each beam forming element is independently adjustable, e.g., as to gain/amplitude and phase.

A "beam-formed signal" is a signal produced by or from a plurality of beam forming elements. In the context of the present invention, there is no requirement that a beam-formed signal have any particular characteristics such as directionality or coherency.

A "phased array system" is a system that includes a plurality of beam forming elements and related control logic for producing and adapting beam-formed signals.

For convenience, the term "beam forming" is sometimes abbreviated herein as "BF."

Various embodiments are described herein in the context of active electronically steered antenna (AESA) systems also called Active Antenna, although the present invention is in no way limited to AESA systems. AESA systems form electronically steerable beams that can be used for a wide variety of applications. Although certain details of various embodiments of an AESA system are discussed below, those skilled in the art can apply some embodiments to other AESA systems. Accordingly, discussion of an AESA system does not necessarily limit certain other embodiments.

Figure 1:
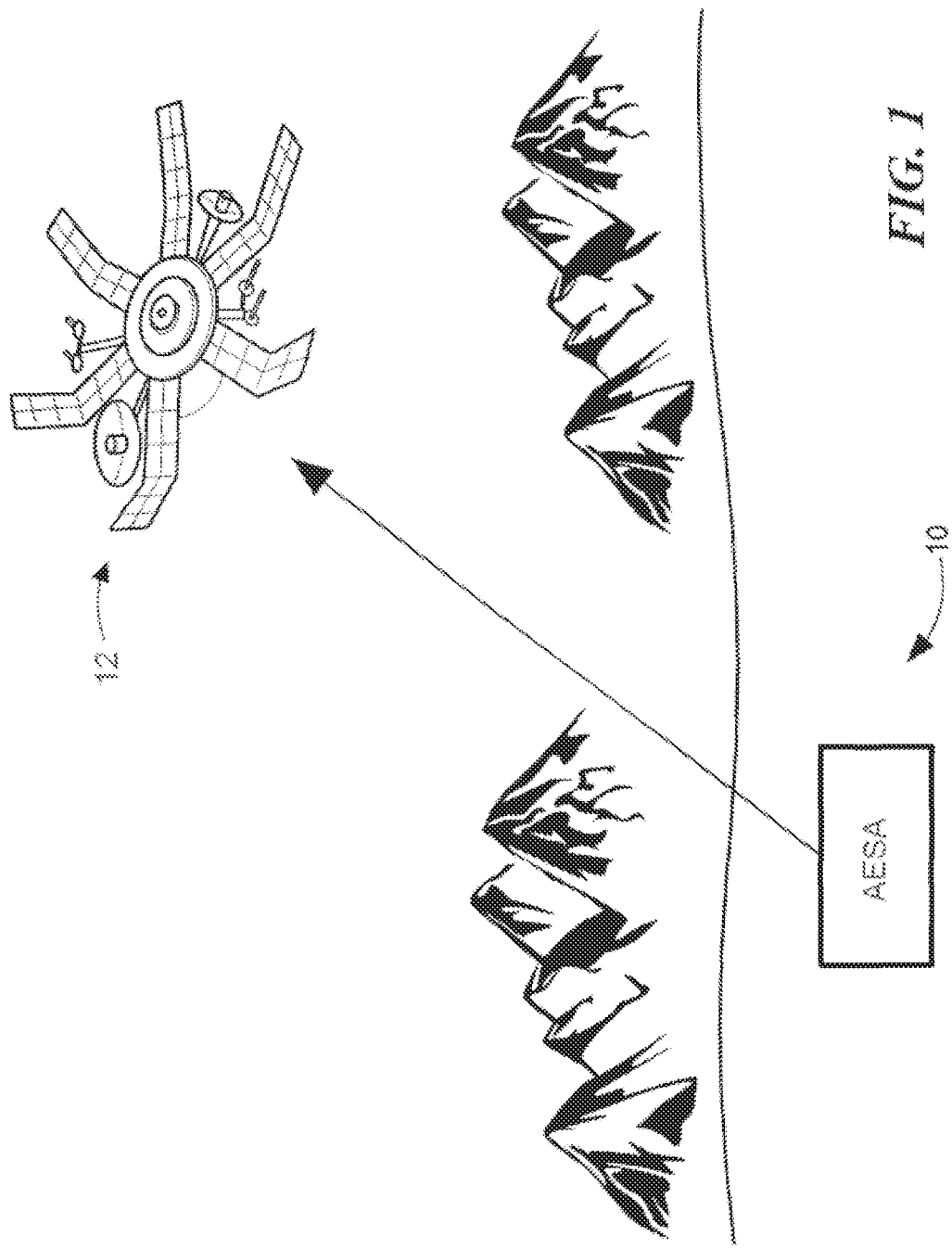
FIG. 1 schematically shows an active electronically steered antenna system ("AESA system") configured in accordance with certain illustrative embodiments of the invention and communicating with an orbiting satellite.

FIG. 1 schematically shows an active electronically steered antenna system ("AESA system 10") configured in accordance with certain illustrative embodiments of the invention and communicating with an orbiting satellite 12. A phased array (discussed in more detail below and referenced as phased array 10A) implements the primary functionality of the AESA system 10. Specifically, as known by those skilled in the art, the phased array forms one or more of a plurality of electronically steerable beams that can be used for a wide variety of applications. As a satellite communication system, for example, the AESA system 10, preferably is configured operate at one or more satellite frequencies. Among others, those frequencies may include the Ka-band, Ku-band, and/or X-band. Of course, as satellite communication technology progresses, future implementations may modify the frequency bands to communicate using new satellite frequencies.

Figure 2:
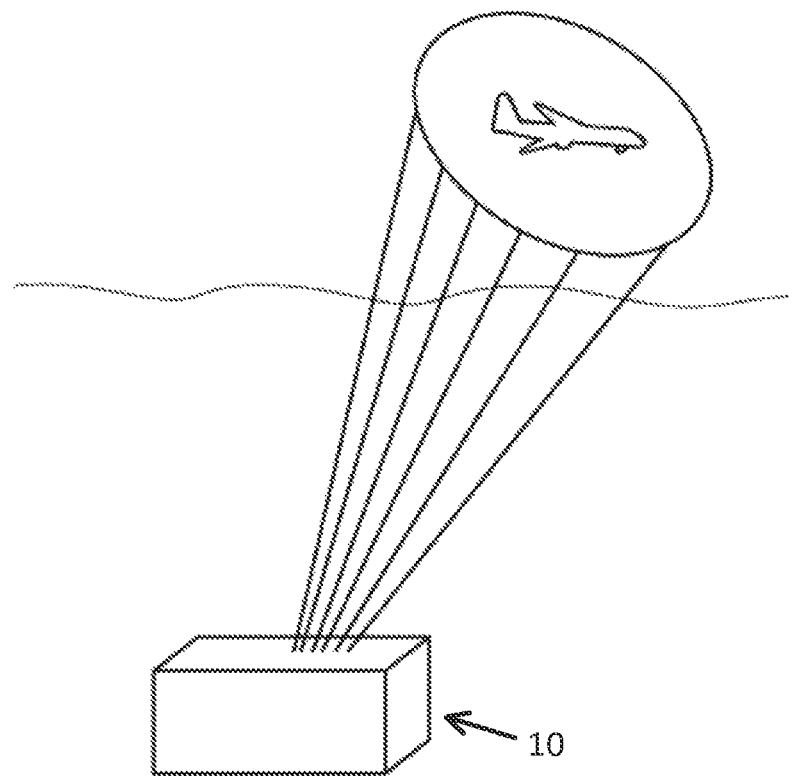
FIG. 2 schematically shows an AESA system configured in accordance with certain illustrative embodiments of the invention and implemented as a radar system in which a beam-formed signal may be directed toward an aircraft or other object in the sky (e.g., to detect or track position of the object).

FIG. 2 schematically shows an AESA system 10 configured in accordance with certain illustrative embodiments of the invention and implemented as a radar system in which a beam-formed signal may be directed toward an aircraft or other object in the sky (e.g., to detect or track position of the object).

Figure 3:
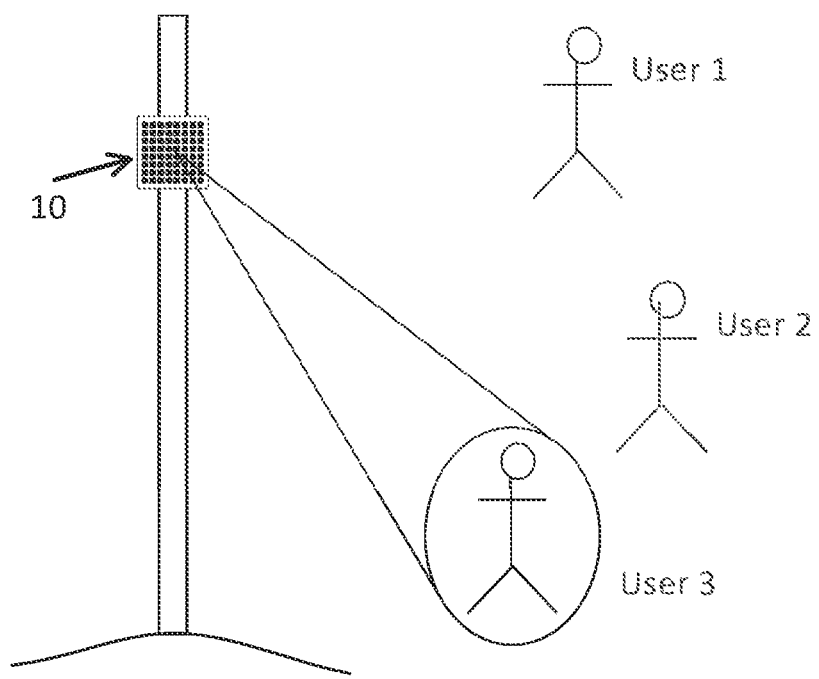
FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells).

FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells). Of course, other implementations may include other types of wireless communication systems.

Of course, those skilled in the art use AESA systems 10 and other phased array systems in a wide variety of other applications, such as RF communication, optics, sonar, ultrasound, etc. Accordingly, discussion of satellite, radar, and wireless communication systems are not intended to limit all embodiments of the invention.

The satellite communication system may be part of a cellular network operating under a known cellular protocol, such as the 3G, 4G (e.g., LTE), or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

As discussed in 4181/1006, which was incorporated by reference above, in certain exemplary embodiments, the beam forming elements may be implemented as patch antennas that are formed on one side of a laminar printed circuit board, although it should be noted that the present invention is not limited to patch antennas or to a laminar printed circuit board. In exemplary embodiments, a phased array includes X beam forming integrated circuits (BFICs), with each BFIC supporting Y beam forming elements (e.g., 2 or 4 beam forming elements per BFIC, although not limited to 2 or 4). Thus, such a phased array includes (X*Y) beam forming elements.

Figure 4:
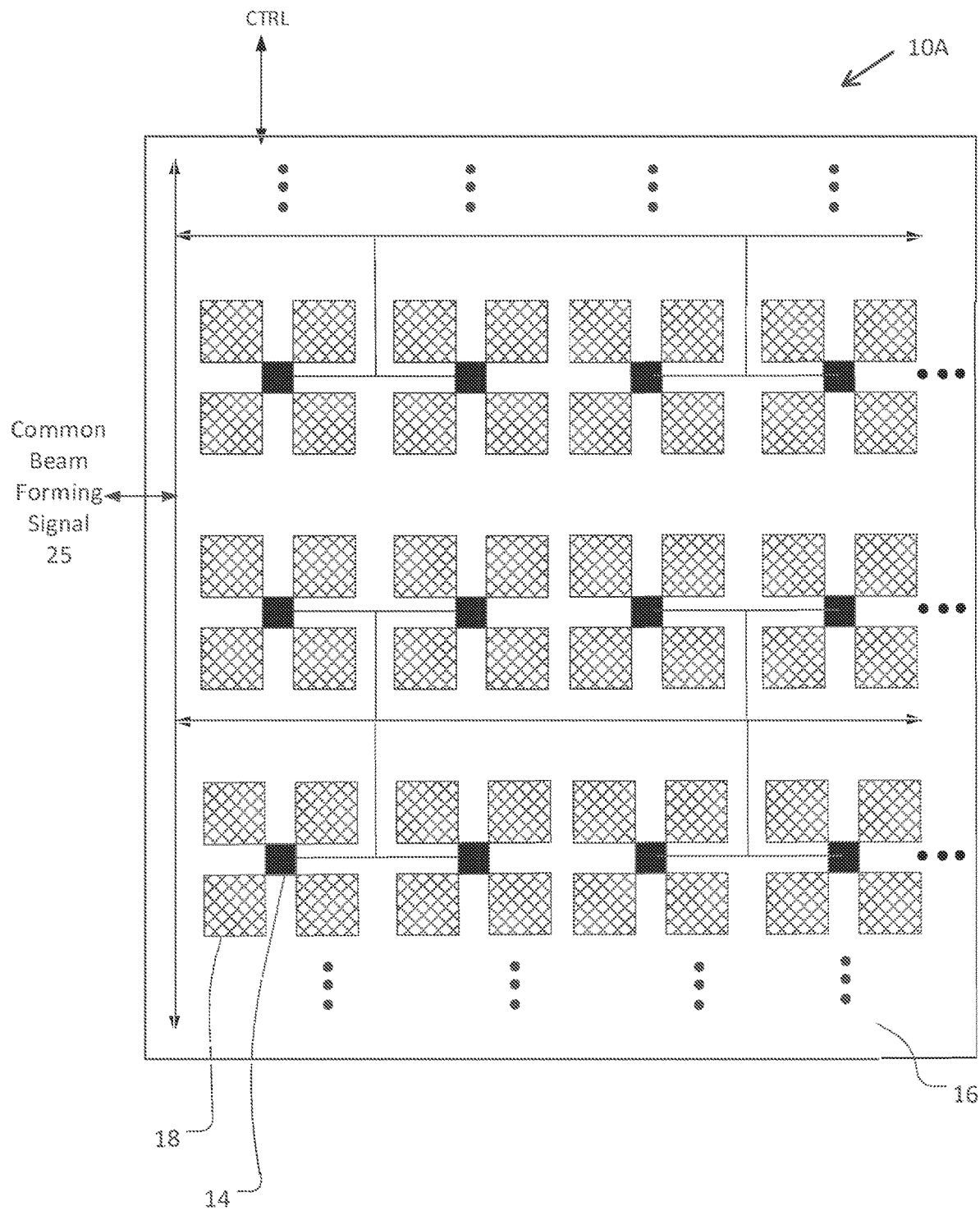
FIG. 4 schematically shows a plan view of a primary portion of an AESA system in which each beam forming integrated circuit (BFIC) is connected to four beam forming to elements, in accordance with illustrative embodiments of the invention.
Figure 5:
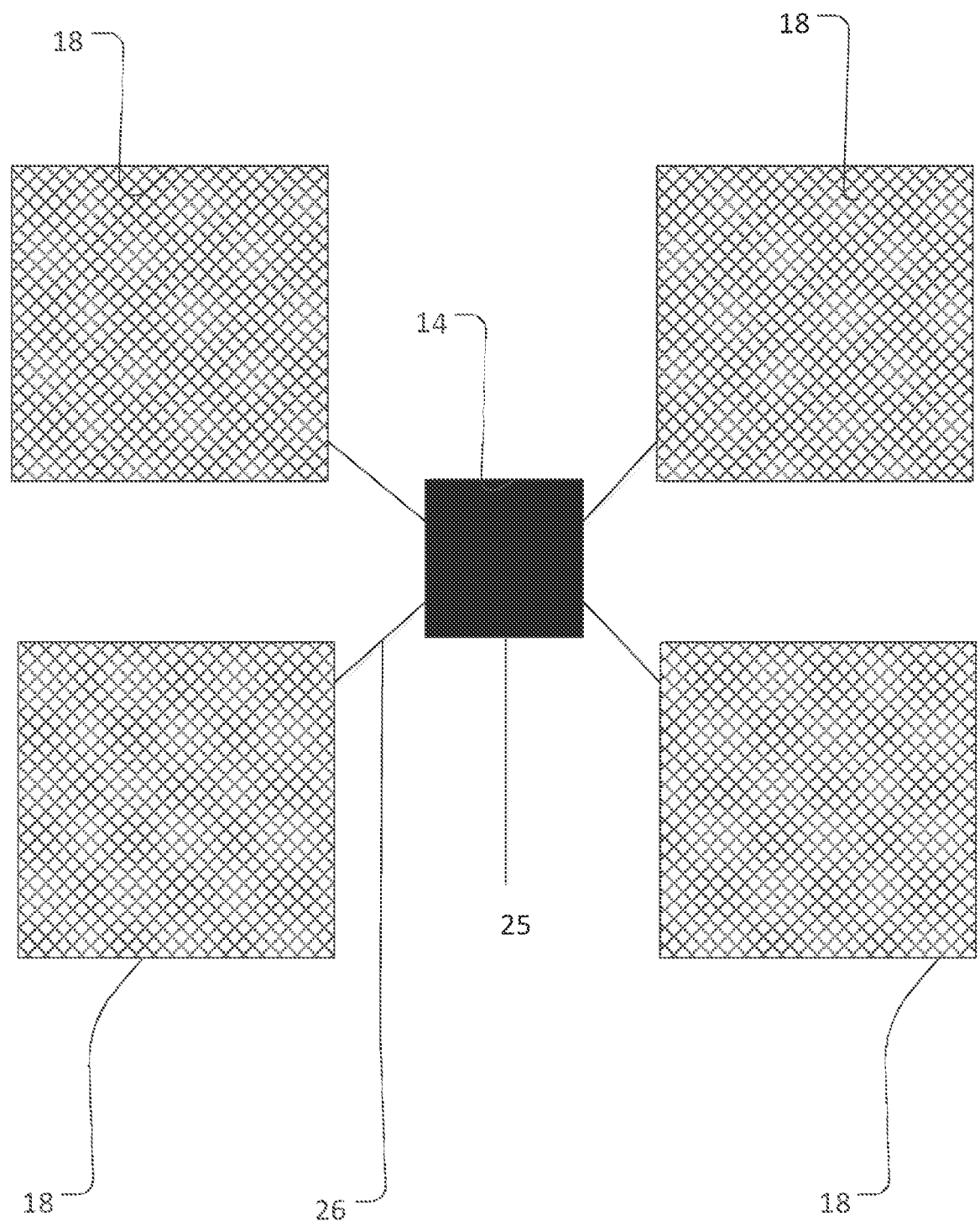
FIG. 5 schematically shows a close-up of a portion of the phased array of FIG. 4.

FIG. 4 schematically shows a plan view of a primary portion of an AESA system 10 in which each beam forming integrated circuit 14 is connected to four beam forming elements 18, in accordance with illustrative embodiments of the invention. Each BFIC 14 aggregates signals to/from the connected beam forming elements as part of a common beam forming signal 25. FIG. 5 schematically shows a close-up of a portion of the phased array 10A of FIG. 4.

Specifically, the AESA system 10 of FIG. 4 is implemented as a laminar phased array 10A having a laminated printed circuit board 16 (i.e., acting as the substrate and also identified by reference number "16") supporting the above noted plurality of beam forming elements 18 and beam forming integrated circuits 14. The elements 18 preferably are formed as a plurality of square or rectangular patch antennas oriented in a patch array configuration. It should be noted that other embodiments may use other patch configurations, such as a triangular configuration in which each integrated circuit is connected to three elements 18, a pentagonal configuration in which each integrated circuit is connected to five elements 18, or a hexagonal configuration in which each integrated circuit is connected to six elements 18. Like other similar phased arrays, the printed circuit board 16 also may have a ground plane (not shown) that electrically and magnetically cooperates with the elements 18 to facilitate operation. In exemplary embodiments, the BFICs are mounted to a back side of the printed circuit board opposite the side containing the patch antennas (e.g., with through-PCB vias and traces that connect to the elements 18, with such connections typically made using impedance controlled lines and transitions), although in alternative embodiments, the BFICs may be mounted to the same side of the printed circuit board as the patch antennas.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. Illustrative embodiments may form the patch antennas using conventional semiconductor fabrication processes, such as by depositing one or more successive metal layers on the printed circuit board 16. Accordingly, using such fabrication processes, each radiating element 18 in the phased array 10A should have a very low profile. It should be noted that embodiments of the present invention are not limited to rectangular-shaped elements 18 but instead any appropriate shape such as circular patches, ring resonator patches, or other shape patches may be used in other particular embodiments.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A generally can be in either a transmit mode, or a receive mode.

The AESA system 10 has a plurality of the above noted integrated circuits 14 (mentioned above with regard to FIG. 5) for controlling operation of the elements 18. Those skilled in the art sometimes refer to these integrated circuits 14 as "beam steering integrated circuits." Each integrated circuit 14 preferably is configured with at least the minimum number of functions to accomplish the desired effect. Indeed, integrated circuits 14 for dual mode (transmit and receive) elements 18 are expected to have some different functionality than that of the integrated circuits 14 for transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
  phase shifting,
  amplitude controlling/beam weighting,
  switching between transmit mode and receive mode,
  output amplification to amplify output signals to the elements 18,
  input amplification for received RF signals (e.g., signals received from the satellite 12), and
  power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches. Additional details of the structure and functionality of integrated circuits 14 are discussed below.

In illustrative embodiments, multiple elements 18 share the integrated circuits 14, thus reducing the required total number of integrated circuits 14. This reduced number of integrated circuits 14 correspondingly reduces the cost of the AESA system 10. In addition, more surface area on the top face of the printed circuit board 16 may be dedicated to the elements 18.

To that end, each integrated circuit 14 preferably operates on at least one element 18 in the array and typically operates on a plurality of elements 18. For example, as discussed above, one integrated circuit 14 can operate on two, three, four, five, six, or more different elements 18. Of course, those skilled in the art can adjust the number of elements 18 sharing an integrated circuit 14 based upon the application. For example, a single integrated circuit 14 can control two elements 18, three elements 18, four elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly reducing the required size of the printed circuit board 16 and cost of the system.

As noted above, and as discussed in 4181/1004 and 4181/1008, which were incorporated by reference above, dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms (discussed below) of the integrated circuit 14. Instead, such embodiments may duplex at the element 18. This process can be performed by isolating one of the elements 18 between transmit and receive by an orthogonal feed connection. Such a feed connection may eliminate about a 0.8 dB switch loss and improve G/T (i.e., the ratio of the gain or directivity to the noise temperature) by about 1.3 dB for some implementations.

RF interconnect and/or beam forming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP) or other configuration such as extended wafer level ball-grid-array (eWLB) that supports flip chip, or a traditional package, such as quad flat no-leads package (QFN package).

It should be reiterated that although FIG. 4 shows an exemplary AESA system 10 with some specificity (e.g., specific layouts of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configurations of the AESA system 10 shown in FIG. 4 is for convenience only and not intended to limit all embodiments.

Figure 6:
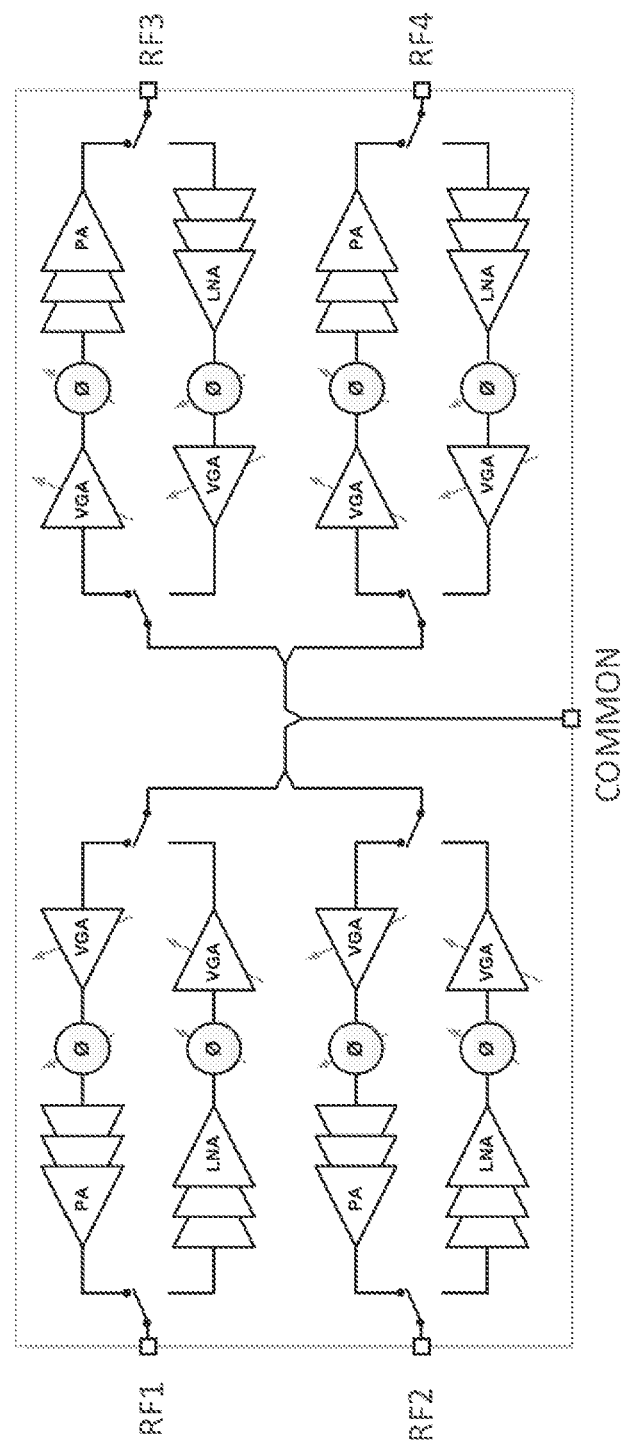
FIG. 6 is a high-level schematic diagram of a four-channel dual-mode BFIC chip in accordance with one exemplary embodiment.

FIG. 6 is a high-level schematic diagram of a four-channel dual-mode BFIC chip in accordance with one exemplary embodiment. Here, each channel has a transmit gain/phase control circuit and a receive gain/phase control circuit that can be switched into and out of the common beam forming signal 25. The transmit gain/phase control circuit includes a variable gain amplifier (VGA), an adjustable phase circuit (Ø), and a power amplifier (PA) stage. The receive gain/phase control circuit includes a low noise amplifier (LNA) stage, an adjustable phase circuit (Ø), and a variable gain amplifier (VGA). In FIG. 6, the BFIC chip is shown with the switches configured in a transmit mode, such that common beam forming signal 25 provided to the BFIC chip is distributed to the four channels. The BFIC chip can be configured in a receive mode by changing the position of the switches, such that signals received on the four channels are output by the BFIC chip as common beam forming signal 25.

Figure 7:
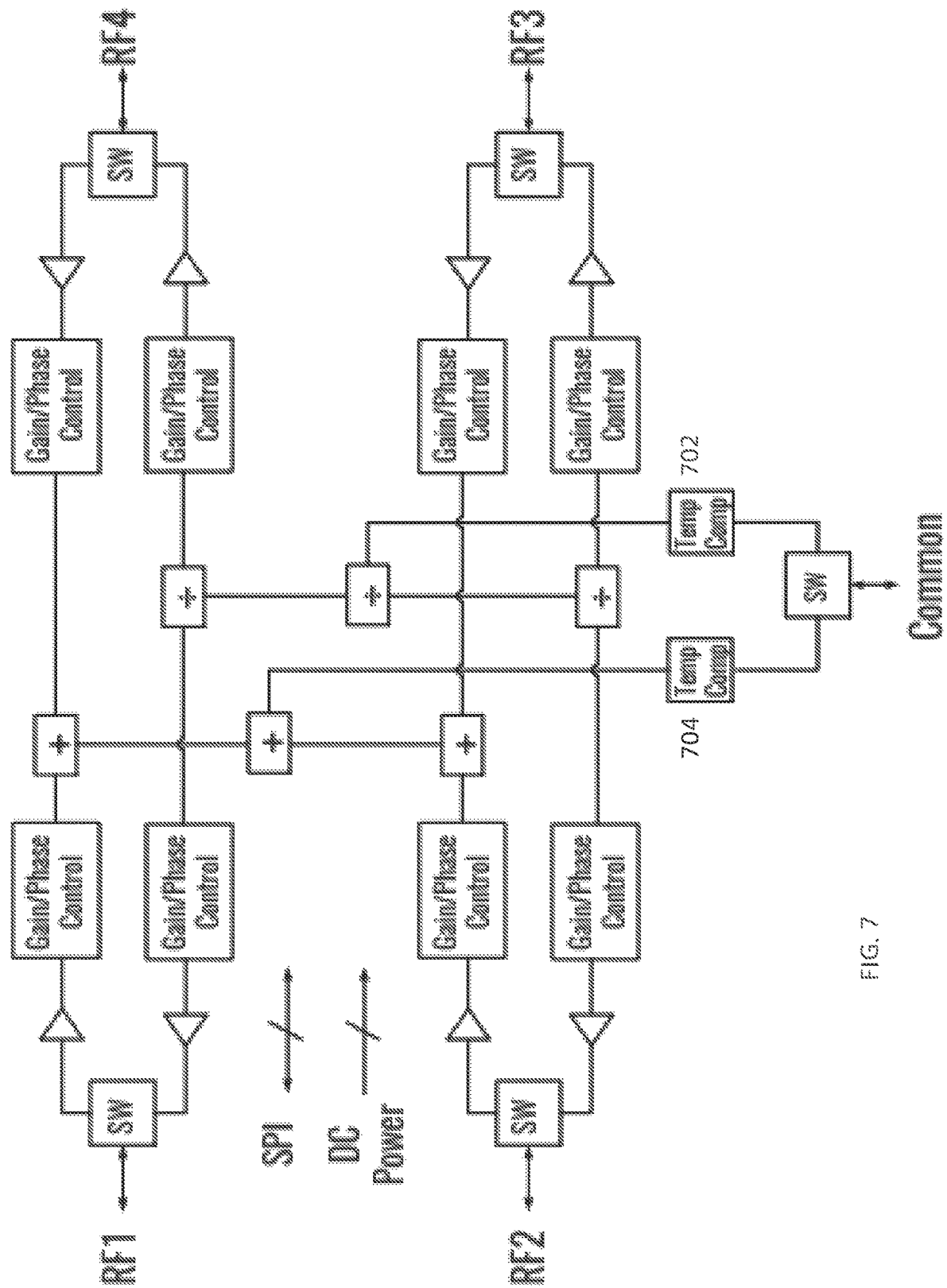
FIG. 7 is a detailed schematic diagram of the BFIC chip of FIG. 6, in accordance with one exemplary embodiment.

FIG. 7 is a detailed schematic diagram of the BFIC chip of FIG. 6, in accordance with one exemplary embodiment. In this exemplary embodiment, the BFIC chip includes temperature compensation (Temp Comp) circuitry to adjust the gain of the transmit and receive signals as a function of temperature based on inputs from a temperature sensor, although alternative embodiments may omit temperature compensation circuitry. In one exemplary embodiment, each Temp Comp circuit includes a digital attenuator that is controlled based on the sensed temperature. Specifically, in this exemplary embodiment, when temperature decreases such that the gain would increase, attenuation is increased in order provide the desired amount of gain, and when temperature increases such that gain would decrease, attenuation is decreased in order to provide the desired amount of gain. In the exemplary embodiment represented in FIG. 7, temperature compensation is performed on the transmit signal prior to distribution to the four RF channels by Temp Comp circuit 702 and is performed on the combined receive signal by Temp Comp circuit 704. Exemplary embodiments may include attenuators of the type described in 4094/1011, although other types of attenuators may be used in alternative embodiments. In various alternative embodiments, temperature compensation may be performed in other ways, such as, for example, by controlling of the gain of the transmit and receive RF amplifiers.

Figure 8:
FIG. 8 is a schematic diagram showing a pinout for the BFIC chip, in accordance with a first exemplary embodiment.

FIG. 8 is a schematic diagram showing a pinout for the BFIC chip, in accordance with a first exemplary embodiment. This pinout tends to improve isolation of the RF signals from high-frequency digital signals by placing the pin for the common beam forming signal 25 on the bottom edge (RF_COM), placing the pins for the RF channels on the left and right edges (RF1, RF2, RF3, RF4), and placing the high-frequency digital signal pins on the top edge (SPI_CLK, SPI_PDI, SPI_SDI, SPI_SDO, etc.). In this exemplary embodiment, the BFIC chip includes a serial interface (SPI_SDI input pad/pin and SPI_SDO output pad/pin) and a parallel interface (SPI_PDI input pad/pin), for example, as discussed in 4181/1018, which was incorporated by reference above. It should be noted that references to top, side, and bottom edges of the chip are relative to the orientation shown in FIG. 8 and are used merely for convenience to describe the relative placement of the pins. Isolation of RF signals from high-frequency digital signals is discussed in 4181/1007 and 4181/1012, which were incorporated by reference above.

Figure 9:
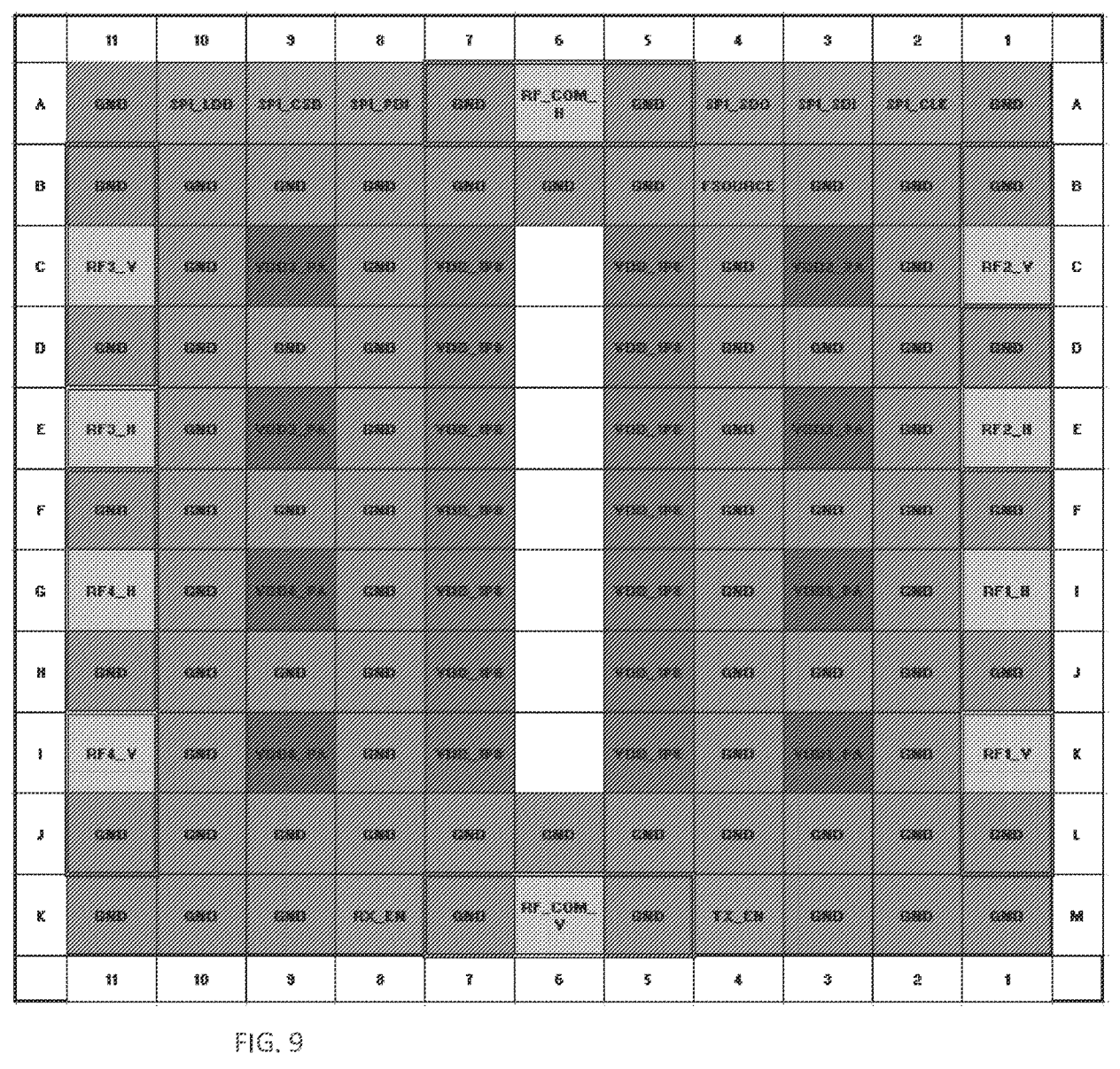

FIG. 9 is a schematic diagram showing a pinout for the BFIC chip, in accordance with a second exemplary embodiment. This pinout is for a dual pole version of the BFIC, i.e., where each RF interface utilizes two signals (referred to as signals H and V). In this pinout, the pins for the common beam forming signal 25 are placed on the top and bottom edges (RF_COM_H and RF_COM_V), the pins for the RF channels are placed on the left and right edges (RF1_H/V, RF2_H/V, RF3_H/V, RF4_H/V), and the pins for the high-frequency digital signals are placed to substantially maximize distance from, and interference with, the RF signals.

In certain exemplary embodiments, signals to/from a number of BFIC chips are aggregated by a conditioning integrated circuit (CDIC) chip, and signals to/from a number of CDIC chips are aggregated by an interface integrated circuit (IFIC) chip. The BFIC chips, CDIC chips, and IFIC chips can be used to create different sized sub-arrays (e.g., a sub-array having 64 beam forming elements or a sub-array having 256 beam forming elements), and in some embodiments multiple sub-arrays are used to form larger arrays. Thus, one exemplary embodiment includes a chipset including a BFIC chip, a CDIC chip, and an IFIC chip that can be used in various combinations in order to produce various array and sub-array configurations. In exemplary embodiments, the three chips (CDIC, BFIC and IFIC) can be combined in a modular fashion and in combination they can create arbitrary arrays of any form factor and size. While the IFIC performs frequency translation, the CDIC is the IC that performs signal conditioning and distribution for an antenna array and feeds into the BFICs to form the beam(s). In typical situations, there are many antenna elements and thus many BFICs, but only a small number of CDIC and IFIC chips. The ability to form arbitrary arrays is very useful for 5G arrays such as those used for base station, consumer premise equipment, and user equipment (such cell phones).

In certain exemplary embodiments, each BFIC chip supports a number of beam forming elements (e.g., four beam forming elements per BFIC chip in one exemplary embodiment, although other configurations are possible), and signals to/from groups of BFIC chips are aggregated through a network of interconnected CDIC chips to a single IFIC chip. In some exemplary embodiments, the CDIC chips have two signal channels, while in other exemplary embodiments, the CDIC chips have other numbers of signal channels (e.g., four signal channels). In certain exemplary embodiments, the IFIC is essentially a single-channel device through which beam forming signals for a given sub-array are transmitted and received.

Figure 10:
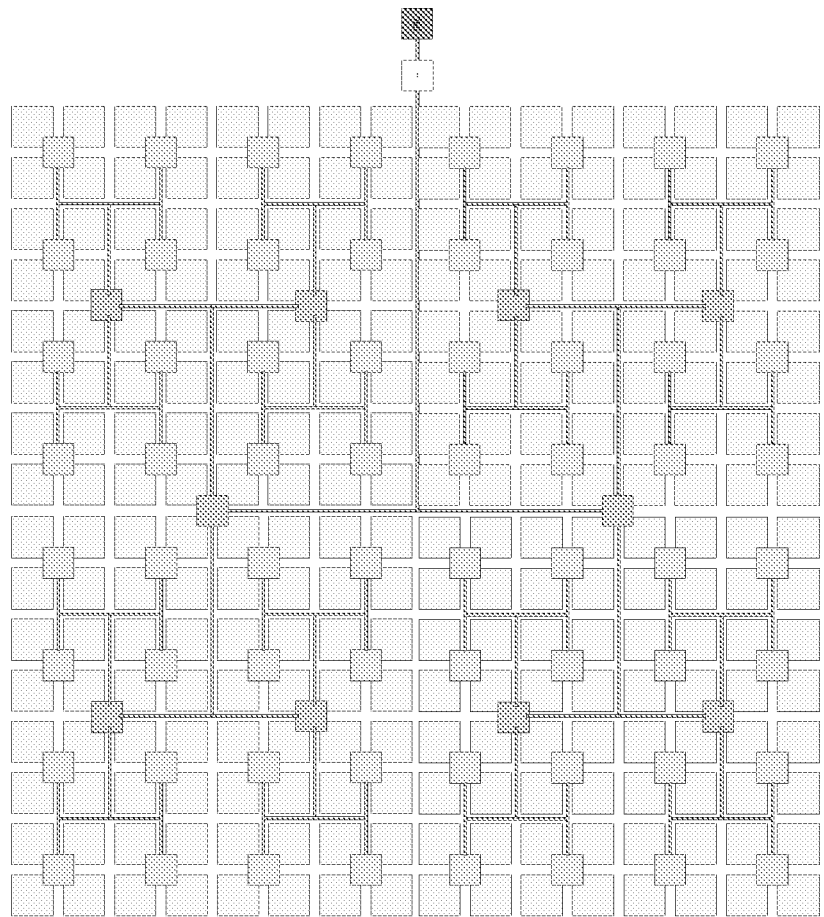
FIG. 10 is a schematic diagram showing a 64-element sub-array and a 256-element sub-array in accordance with certain exemplary embodiments.
Figure 10:
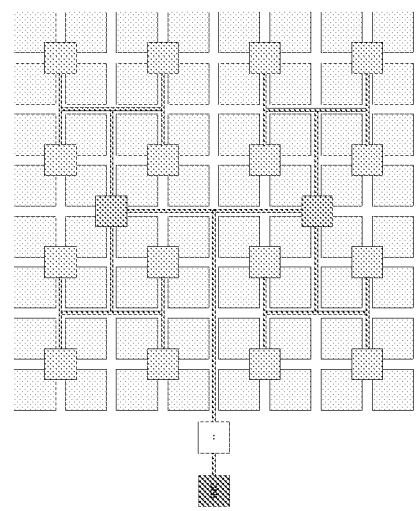

FIG. 10 is a schematic diagram showing a 64-element sub-array and a 256-element sub-array in accordance with certain exemplary embodiments. In the 64-element sub-array, each BFIC chip supports a set of four beam forming elements (i.e., 16 BFIC chips), each CDIC chip aggregates signals to/from a set of eight BFIC chips, and the IFIC chip aggregates signals to/from the two CDIC chips. In the 256-element sub-array, each BFIC chip supports a set of four beam forming elements (i.e., 64 BFIC chips), each CDIC chip in an outer tier of CDIC chips aggregates signals to/from a set of eight BFIC chips, each CDIC chip in an inner tier of CDIC chips aggregates signals to/from a set of four outer-tier CDIC chips, and the IFIC chip aggregates signals to/from the two inner-tier CDIC chips. Also shown is an optional filter placed between the IFIC chip and the CDIC chips, e.g., a bandpass filter. Typically, an external controller (not shown) controls the various BFIC, CDIC, and IFIC chips in the system.

Figure 11:
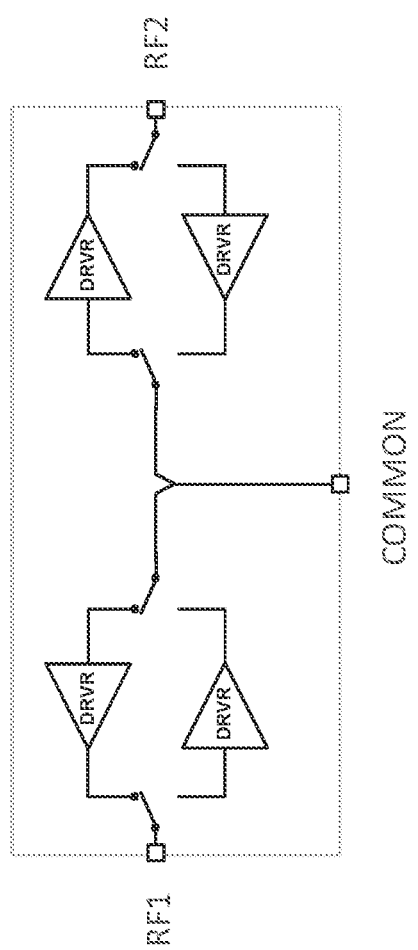
FIG. 11 is a high-level schematic diagram of a two-channel dual-mode CDIC chip in accordance with one exemplary embodiment.

FIG. 11 is a high-level schematic diagram of a two-channel dual-mode CDIC chip in accordance with one exemplary embodiment. Here, each channel has a transmit gain/phase control circuit and a receive gain/phase control circuit (referred to here as drivers—abbreviated DRVR) that can be switched into and out of the common beam forming signal path. In FIG. 11, the CDIC chip is shown with the switches configured in a transmit mode, such that a common beam forming signal provided to the CDIC chip is distributed to the two channels. The CDIC chip can be configured in a receive mode by changing the position of the switches, such that signals received on the two channels are output by the CDIC chip as a common beam forming signal.

Figure 12:
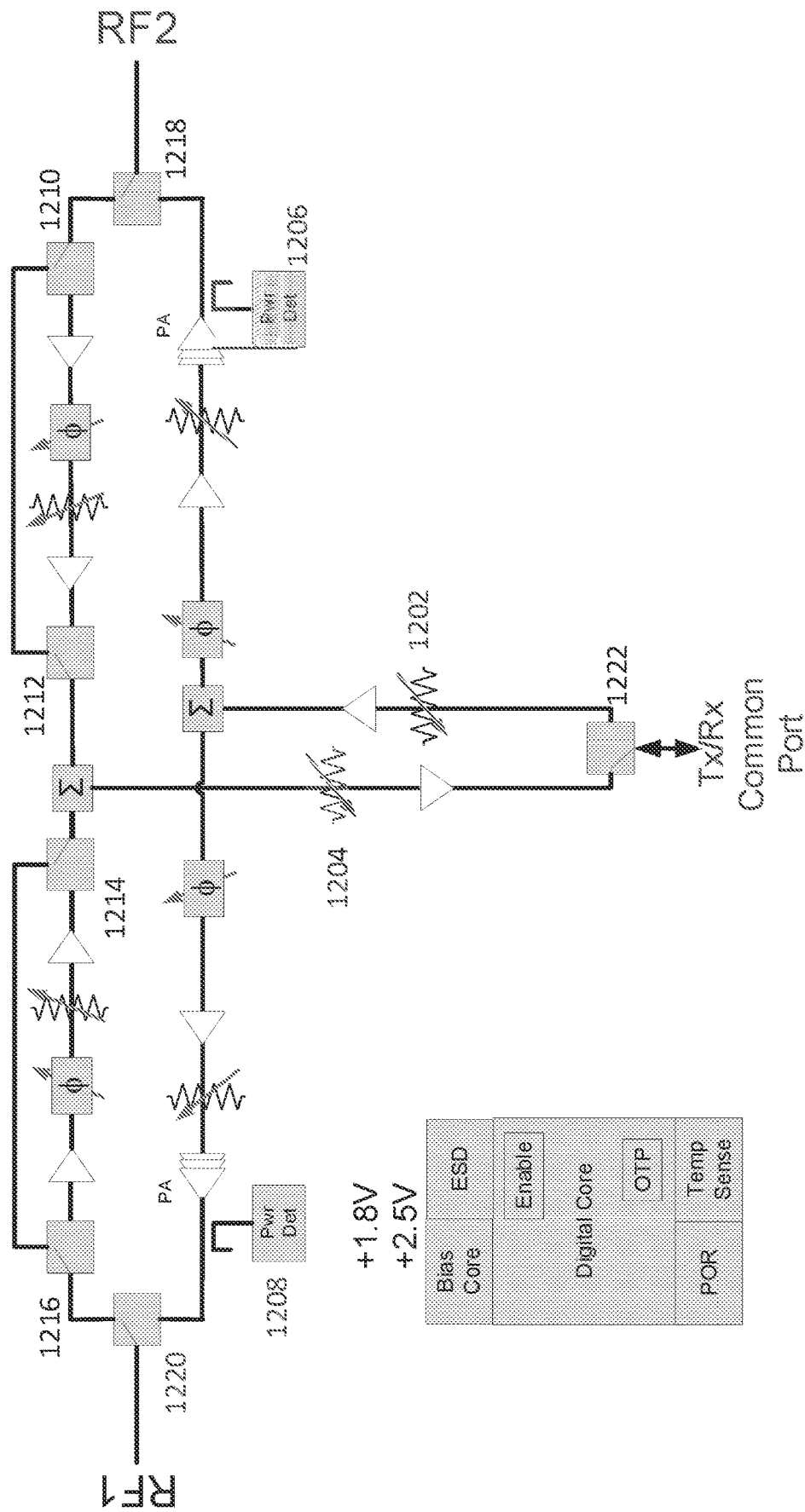
FIG. 12 is a detailed schematic diagram of the CDIC chip of FIG. 11, in accordance with one exemplary embodiment.

FIG. 12 is a detailed schematic diagram of the CDIC chip of FIG. 11, in accordance with one exemplary embodiment. In FIG. 12, the CDIC chip is shown with the switches configured in a receive mode with the receive signals bypassing the receive gain/phase control circuitry. Changing the position of switches 1210, 1212, 1214 and 1216 will pass the receive signals through the receive gain/phase control circuitry (in some embodiments, each channel can be switched separately such that one receive channel includes gain/phase control and the other channel does not include gain/phase control). Changing the position of switches 1218, 1220 and 1222 will place the CDIC chip in the transmit mode. It should be noted that some alternative embodiments eliminate the switch 1222 and instead have separate transmit and receive signal interfaces.

In this exemplary embodiment, the CDIC chip includes temperature compensation circuitry to adjust the gain of the transmit and receive signals as a function of temperature based on inputs from a temperature sensor. In one exemplary embodiment, each Temp Comp circuit includes a digital attenuator that is controlled based on the sensed temperature. Specifically, in this exemplary embodiment, when temperature decreases such that the gain would increase, attenuation is increased in order provide the desired amount of gain, and when temperature increases such that gain would decrease, attenuation is decreased in order to provide the desired amount of gain. In the exemplary embodiment represented in FIG. 12, temperature compensation is performed on the transmit signal prior to distribution to the two RF channels by temperature compensation circuit 1202 and is performed on the combined receive signal by temperature compensation circuit 1204. Exemplary embodiments may include attenuators of the type described in 4094/1011, although other types of attenuators may be used in alternative embodiments. In various alternative embodiments, temperature compensation may be performed in other ways, such as, for example, by controlling of the gain of the transmit and receive RF amplifiers.

Figure 13:
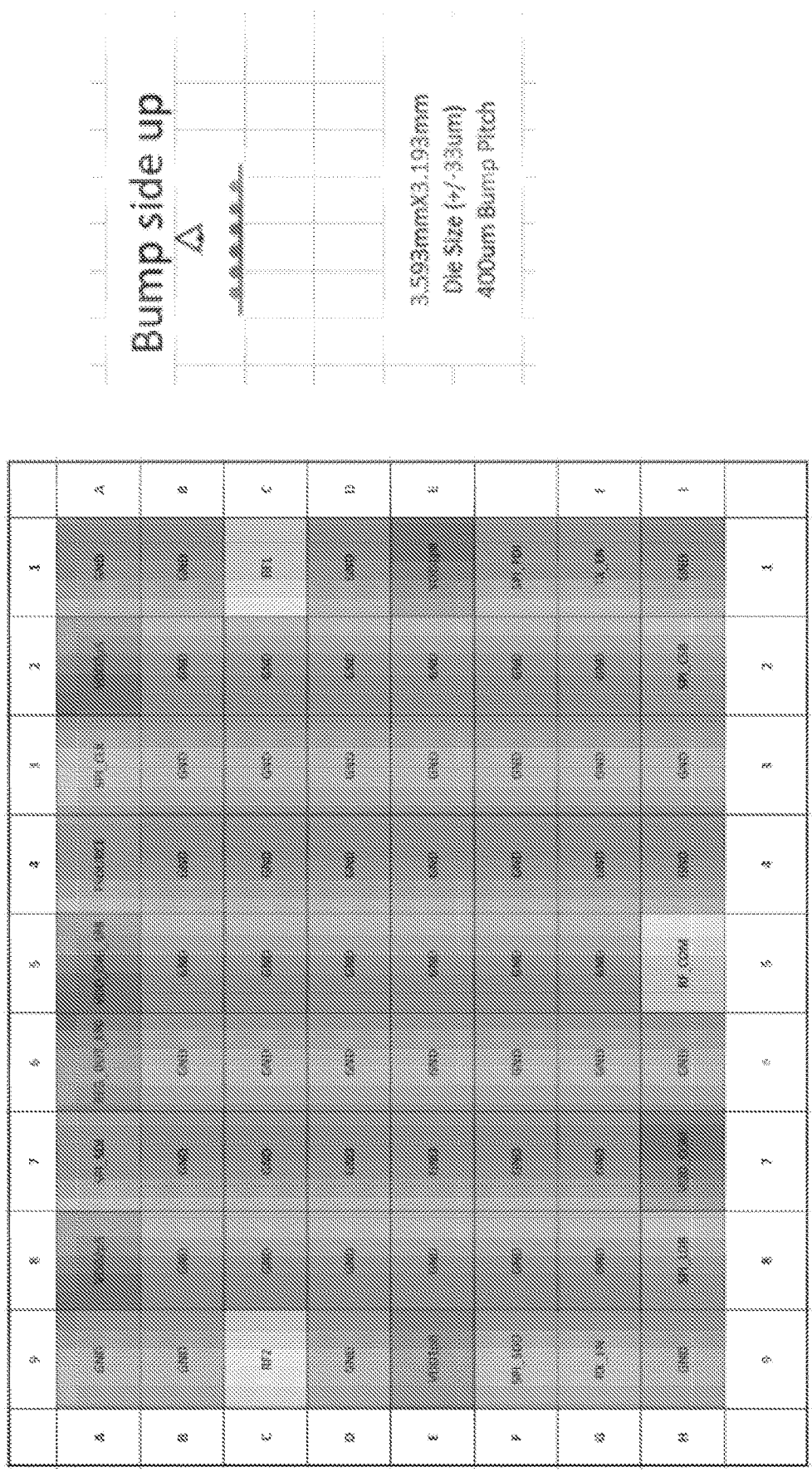
FIG. 13 is a schematic diagram showing a pinout for the CDIC chip, in accordance with a one exemplary embodiment.

In certain exemplary embodiments, some benefits of the CDIC chip(s) include:
  The CDIC chip(s) may be outside or inside the lattice structure
  Provides for scalability to larger arrays
  Provides flexibility to adjust gain distribution to optimize RF parameters, after fabrication and array assembly
  Allows for relaxation of gain requirements on the BFIC chips (hence, lower risk of ripple and oscillation)
  Allows for phase adjustment across sub-arrays
  No calibration needed due to Anokiwave all-silicon solution
  Higher receive signal linearity modes FIG. 13 is a schematic diagram showing a pinout for the CDIC chip, in accordance with a one exemplary embodiment. This pinout tends to improve isolation of the RF signals from high-frequency digital signals by placing the pin for the common beam forming signal 25 on the bottom edge (RF_COM), placing the pins for the RF channels on the left and right edges (RF1, RF2), and placing the high-frequency digital signal pins (SPI_CLK, SPI_PDI, etc.) to substantially maximize distance from, and interference with, the RF signals. It should be noted that references to top, side, and bottom edges of the chip are relative to the orientation shown in FIG. 13 and are used merely for convenience to describe the relative placement of the pins.

Importantly, within a given sub-array, a majority of the temperature compensation is performed by the CDIC chips compared to the BFIC chips. In this respect, the CDIC chips are configured with more gain that is throttled up or down as a function of temperature (e.g., using an attenuator). For but one example, supposing that there is a total gain drop of 14 dB over the operating temperature range, the CDIC chip(s) may compensate for 10 dB of gain, while the remaining compensation is performed by the BFIC chip(s). Thus, less temperature compensation is performed in the BFIC chips, thereby increasing the efficiency of the system as the gain needed in BFIC is reduced and less power is wasted.

Figure 14:
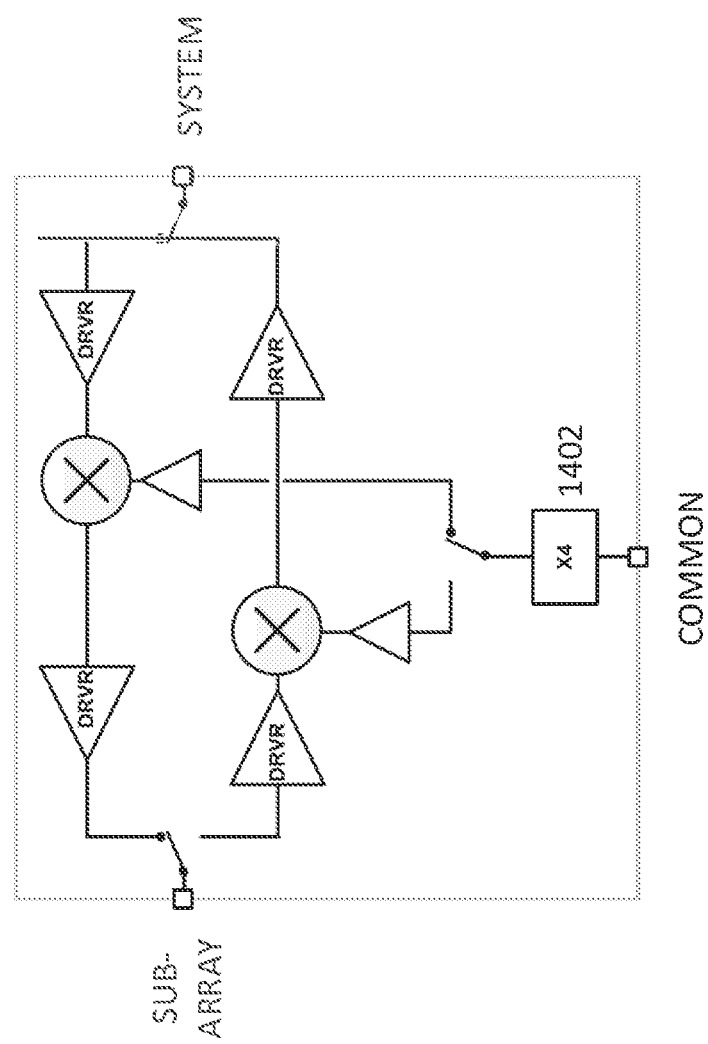
FIG. 14 is a high-level schematic diagram of a dual-mode IFIC chip in accordance with one exemplary embodiment.

FIG. 14 is a high-level schematic diagram of a dual-mode IFIC chip in accordance with one exemplary embodiment. The IFIC has a transmit circuit and a receive circuit that can be switched into and out of the common beam forming signal 25. In FIG. 14, the IFIC chip is shown with the switches configured in a transmit mode, such that a common beam forming signal provided to the IFIC chip from the system (IF) side is distributed to the sub-array (RF) side. The IFIC chip can be configured in a receive mode by changing the position of the switches, such that a common beam forming signal received from the sub-array side is provided to the system side.

In this exemplary embodiment, the IFIC chip has integral up/down converter circuitry to convert between lower frequencies used on the IF side and higher frequencies used on the RF side. When the IFIC chip is in the transmit mode, the transmit signal from the IF side is up-converted to a higher frequency range used by the RF side, and when the IFIC chip is in the receive mode, the receive signal from the RF side is down-converted to the lower-frequency range used by the IF side. In certain exemplary embodiments, the IF side operates in approximately the 4.875-5.725 GHz frequency range, while the RF side operates in approximately the 27.5-28.35 GHz frequency range. In certain exemplary embodiments, the IFIC chip also has temperature compensation circuitry, although alternative embodiments may omit temperature compensation circuitry.

Figure 15:
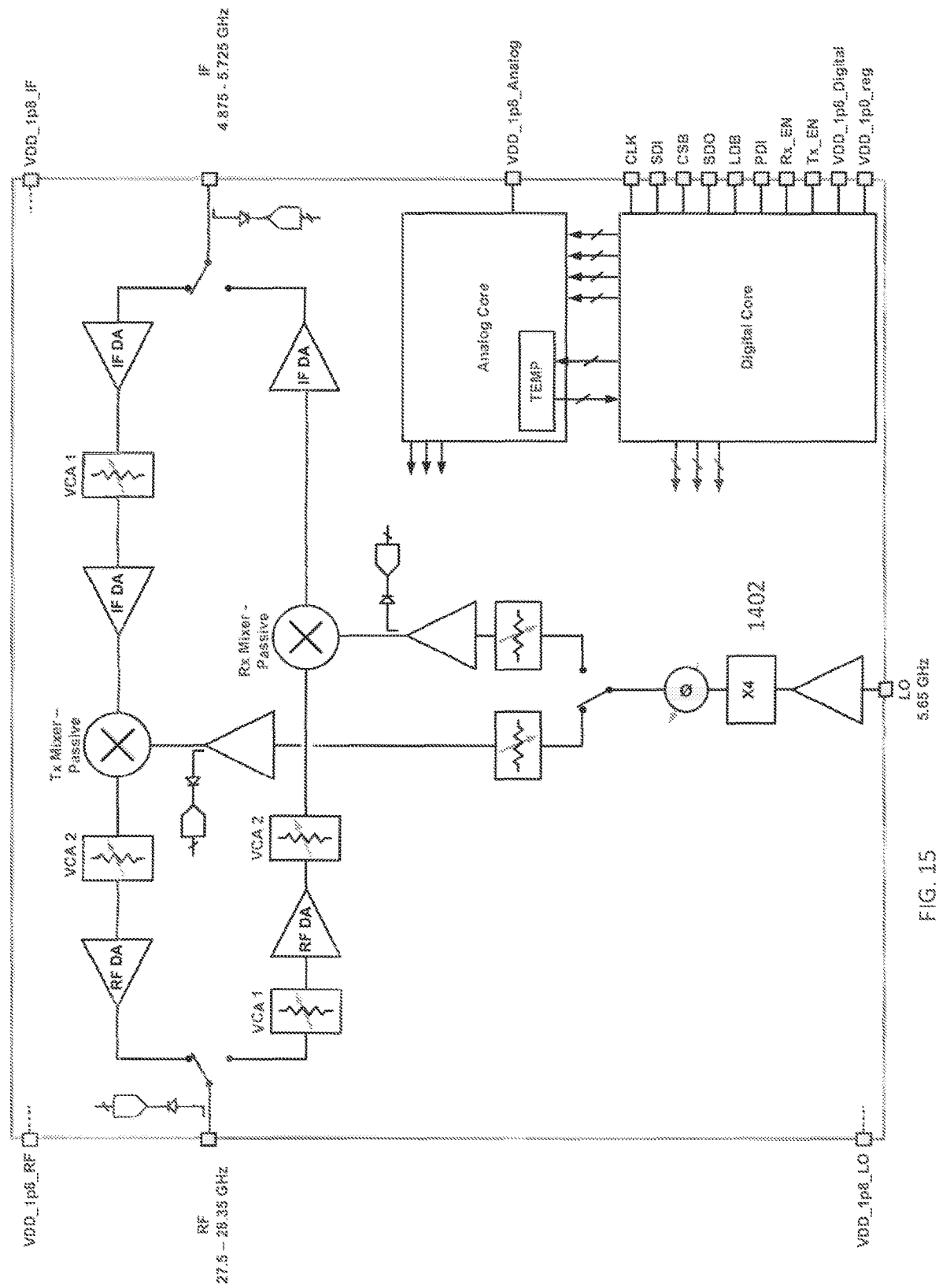
FIG. 15 is a detailed schematic diagram of the IFIC chip of FIG. 14, in accordance with one exemplary embodiment.

FIG. 15 is a detailed schematic diagram of the IFIC chip of FIG. 14, in accordance with one exemplary embodiment. Here, the up/down conversion is performed by a 4× multiplier 1402 using a 5.65 GHz reference signal, thereby up/down converting the signals by approximately 22.6 GHz.

Figure 16:
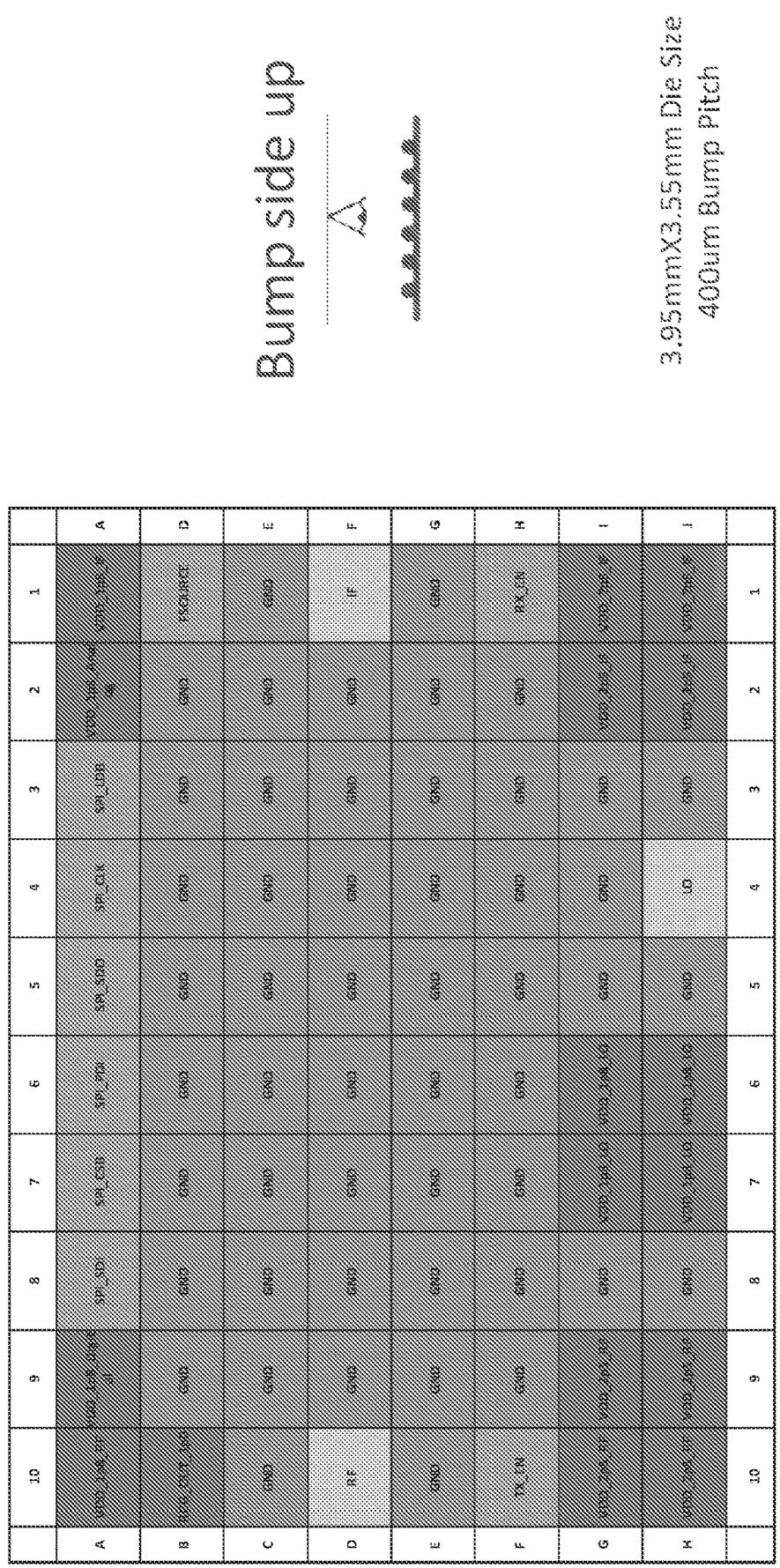
FIG. 16 is a schematic diagram showing a pinout for the IFIC chip, in accordance with one exemplary embodiment.

FIG. 16 is a schematic diagram showing a pinout for the IFIC chip, in accordance with one exemplary embodiment.

As discussed above, an external controller may control the various BFIC, CDIC, and IFIC chips in the system. This external controller can be configured to determine the distribution of temperature compensation between the various chips, e.g., to provide the required amount of gain compensation while substantially optimizing efficiency across the system.

As discussed above, the CDIC chip can be configured with other numbers of channels. For example, a CDIC chip with four channels would reduce by half the number of CDIC chips needed for a given sub-array size relative to CDIC chips with two channels.

Figure 17:
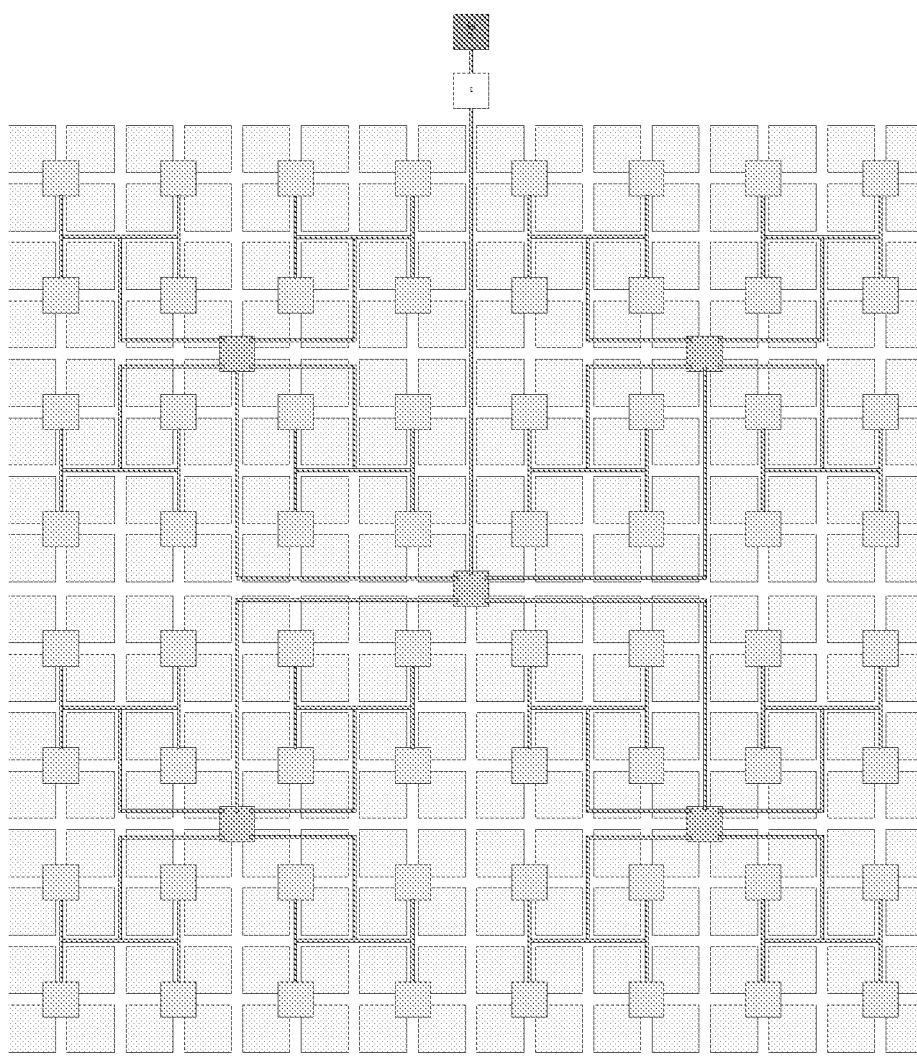
FIG. 17 is a schematic diagram showing a 64-element sub-array and a 256-element sub-array utilizing four-channel CDIC chips in accordance with certain exemplary embodiments.
Figure 17:
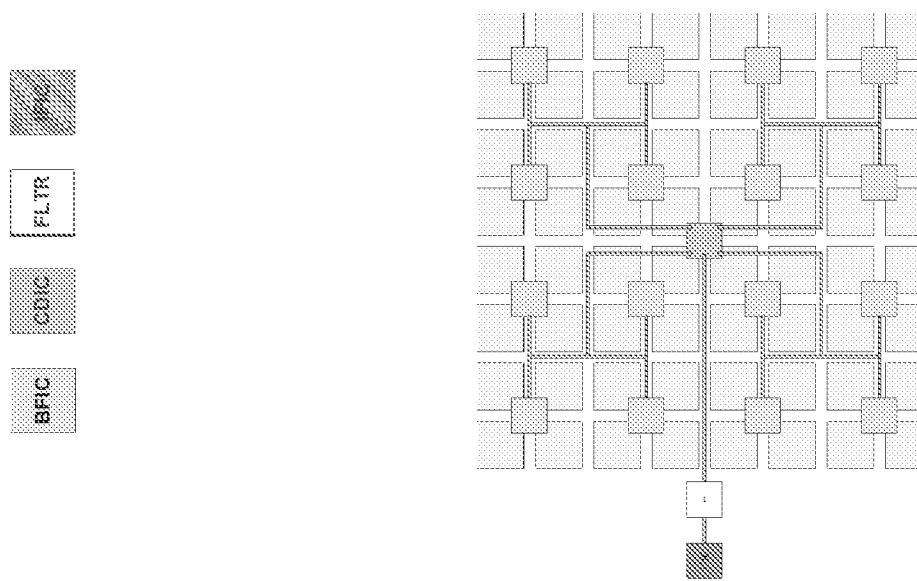

FIG. 17 is a schematic diagram showing a 64-element sub-array and a 256-element sub-array utilizing four-channel CDIC chips in accordance with certain exemplary embodiments. In the 64-element sub-array, each BFIC chip supports a set of four beam forming elements (i.e., 16 BFIC chips), the single CDIC chip aggregates signals to/from all 16 BFIC chips, and the IFIC chip is coupled to the single CDIC chip. In the 256-element sub-array, each BFIC chip supports a set of four beam forming elements (i.e., 64 BFIC chips), each CDIC chip in an outer tier of CDIC chips aggregates signals to/from a set of 16 BFIC chips (i.e., 4 outer-layer CDIC chips), a single central CDIC chip aggregates signals to/from the four outer-tier CDIC chips, and the IFIC chip is coupled to the central CDIC chip. Compared to the exemplary embodiments shown in FIG. 10, these embodiments include half the number of CDIC chips for a given number of beam forming elements and therefore provides the possibility for greater efficiency at the cost of a more complex CDIC chip. Also shown is an optional filter placed between the IFIC chip and the CDIC chips, e.g., a bandpass filter.

Figure 18:
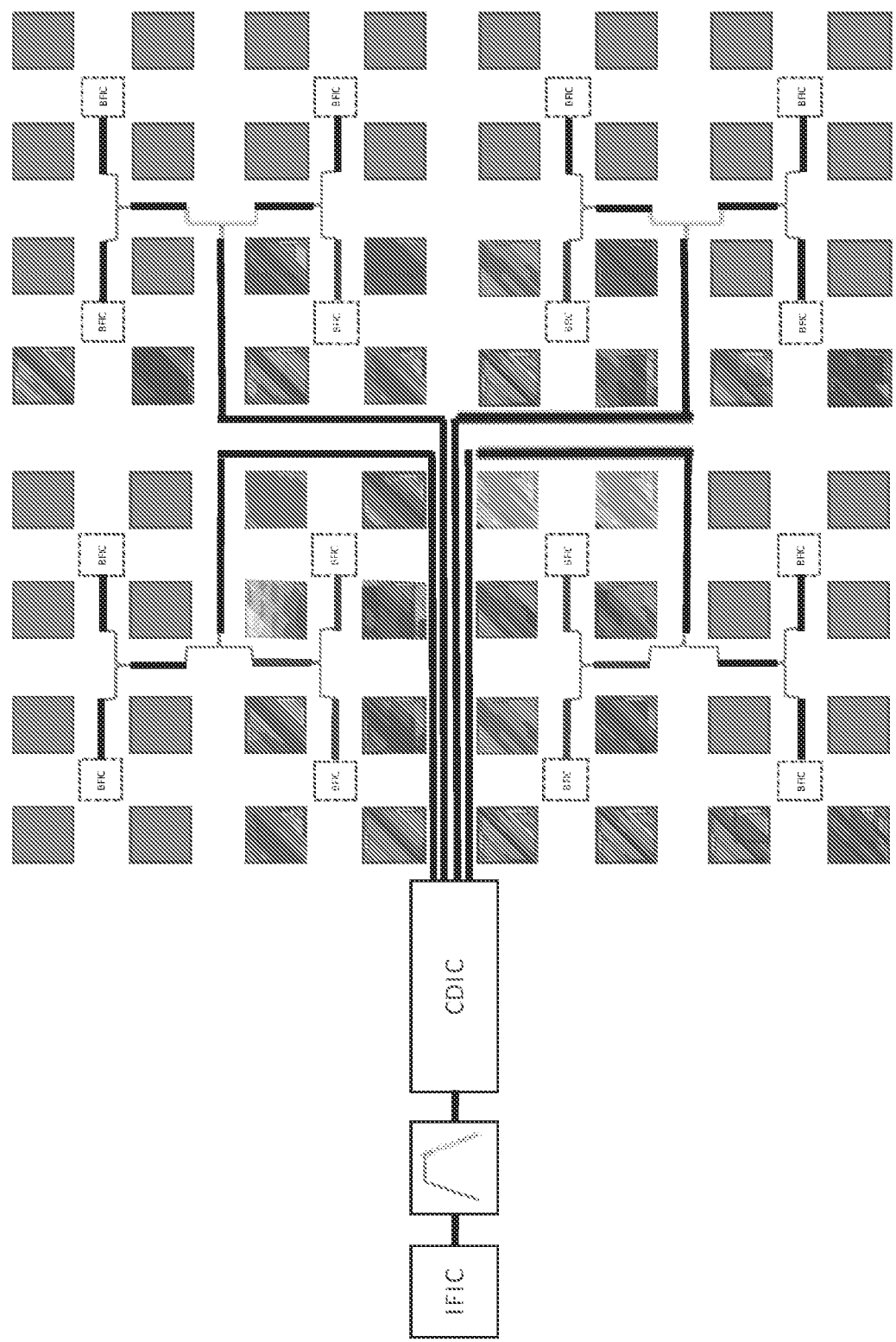
FIG. 18 is a schematic diagram showing an exemplary beam forming routing model for a 64-element sub-array using a four-channel CDIC chip, in accordance with one exemplary embodiment.

FIG. 18 is a schematic diagram showing an exemplary beam forming routing model for a 64-element sub-array using a four-channel CDIC chip, in accordance with one exemplary embodiment.

Figure 19:
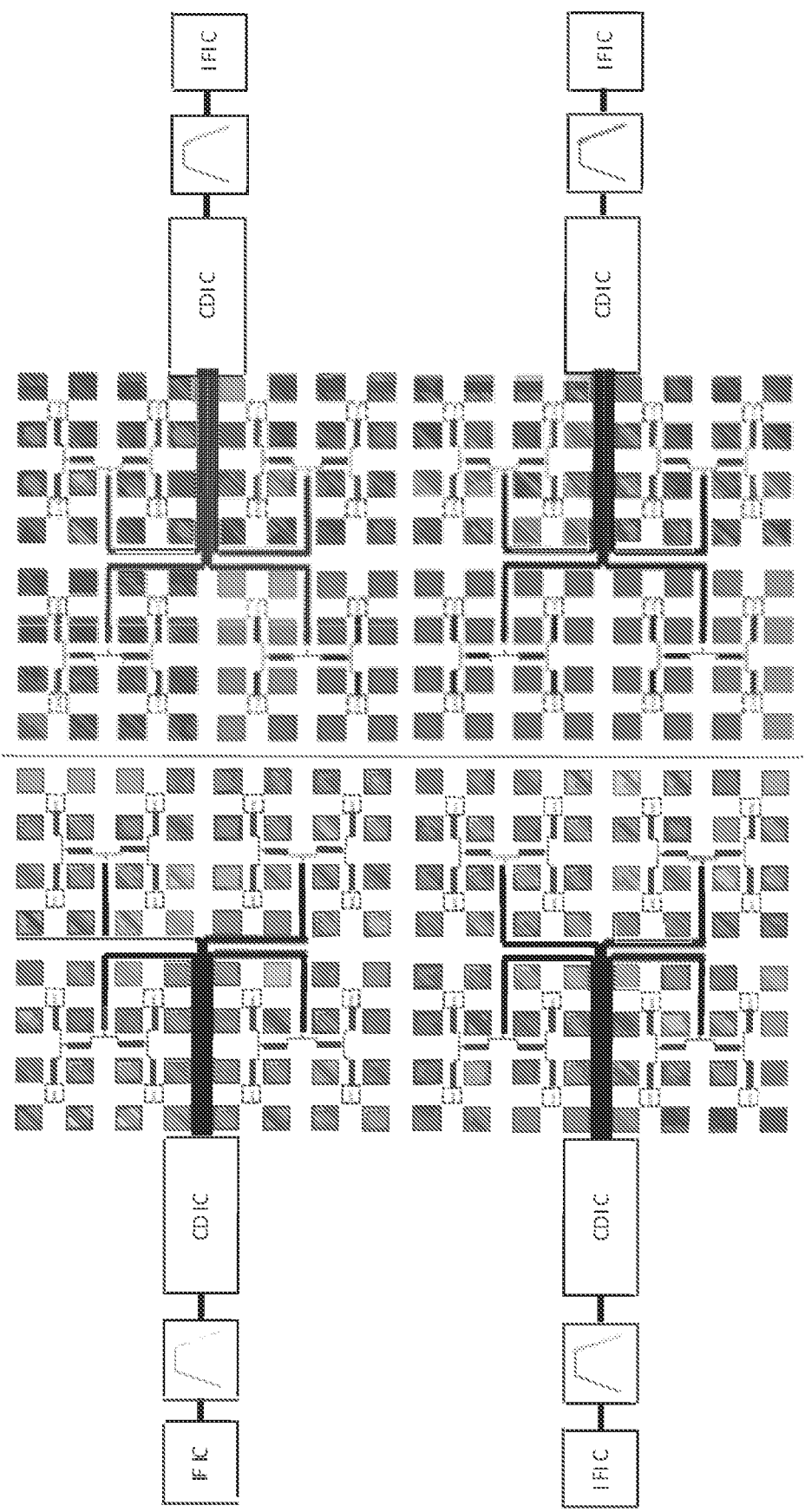
FIG. 19 is a schematic diagram showing an exemplary 256-element array formed from four 64-element sub-arrays of the type shown in FIG. 18, in accordance with one exemplary embodiment.

FIG. 19 is a schematic diagram showing an exemplary 256-element array formed from four 64-element sub-arrays of the type shown in FIG. 18, in accordance with one exemplary embodiment.

Figure 20:
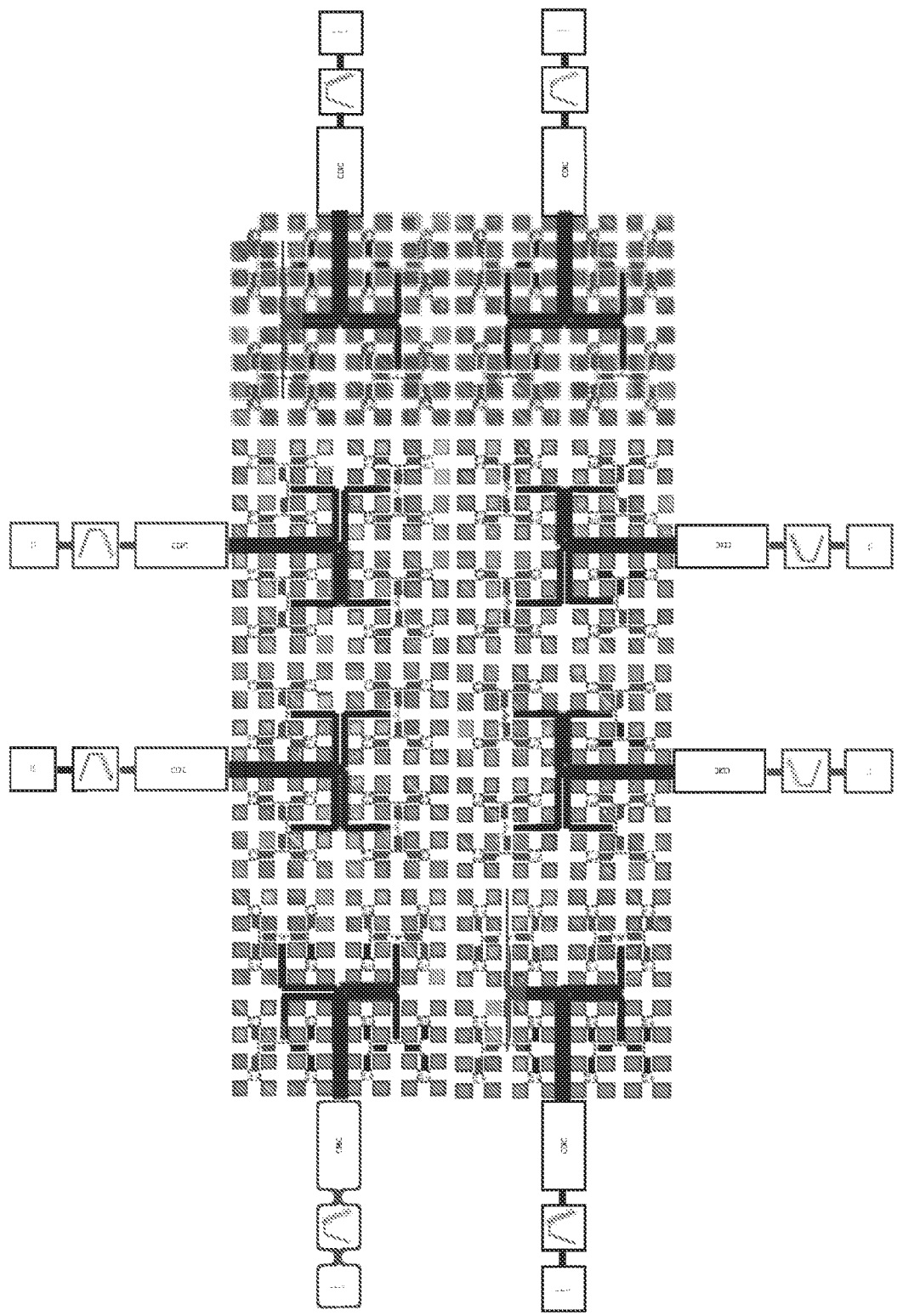
FIG. 20 is a schematic diagram showing an exemplary 512-element array formed from eight 64-element sub-arrays of the type shown in FIG. 18, in accordance with one exemplary embodiment.

FIG. 20 is a schematic diagram showing an exemplary 512-element array formed from eight 64-element sub-arrays of the type shown in FIG. 18, in accordance with one exemplary embodiment.

Figure 21:
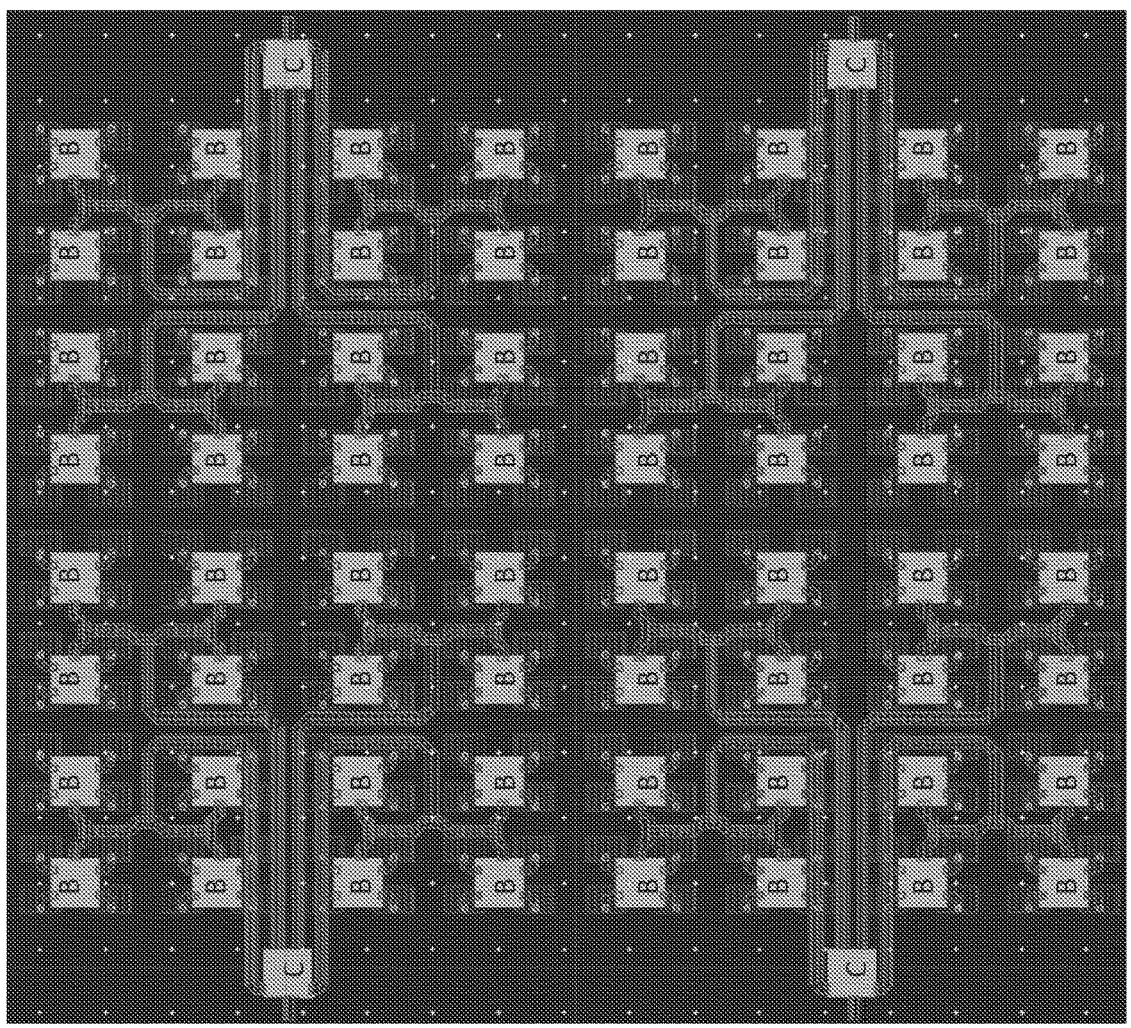
FIG. 21 is a schematic diagram showing a printed circuit board (PCB) array layout for a 4×64 element array of the type shown in FIG. 19, in accordance with one exemplary embodiment.

FIG. 21 is a schematic diagram showing a printed circuit board (PCB) array layout for a 4×64 element array of the type shown in FIG. 19, in accordance with one exemplary embodiment. Here, the printed circuit board is configured for mounting four CDIC chips (the green boxes labeled "C") and 64 BFIC chips (the green boxes labeled "B") on one side of the printed circuit board. In this exemplary embodiment, the beam forming elements are formed on the other side of the printed circuit board, and electrical connections are made from the BFIC chips to the beam forming elements using through-PCB vias. The relative locations of the beam forming elements are shown in blue. The through-PCB vias are represented by the four red circles adjacent to the four corners of each BFIC chip.

Figure 22:
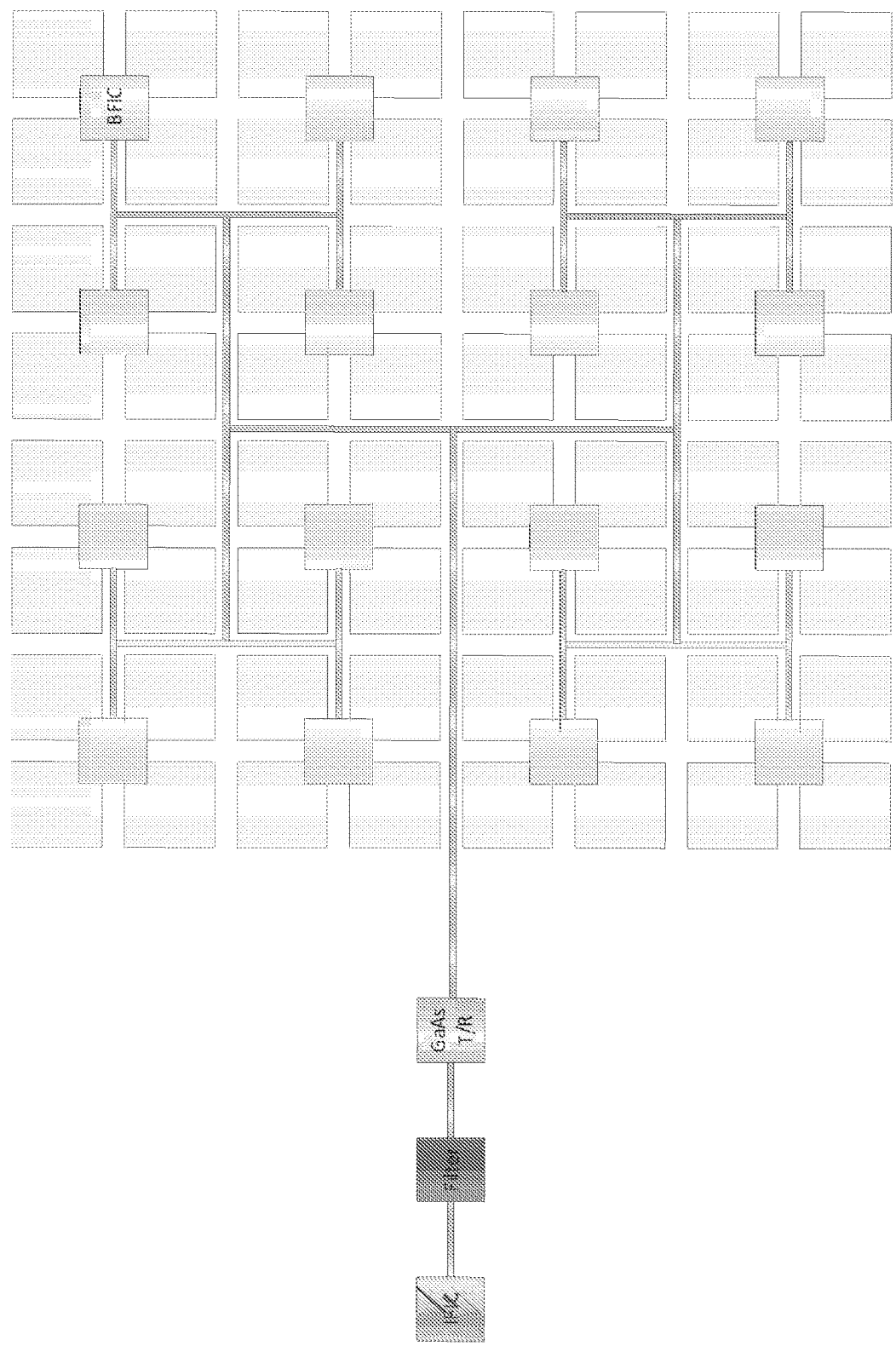
FIG. 22 is a schematic diagram showing a GaAs assisted architecture in accordance with one exemplary embodiment.

FIG. 22 is a schematic diagram showing a GaAs assisted architecture in accordance with one exemplary embodiment.

Figure 23:
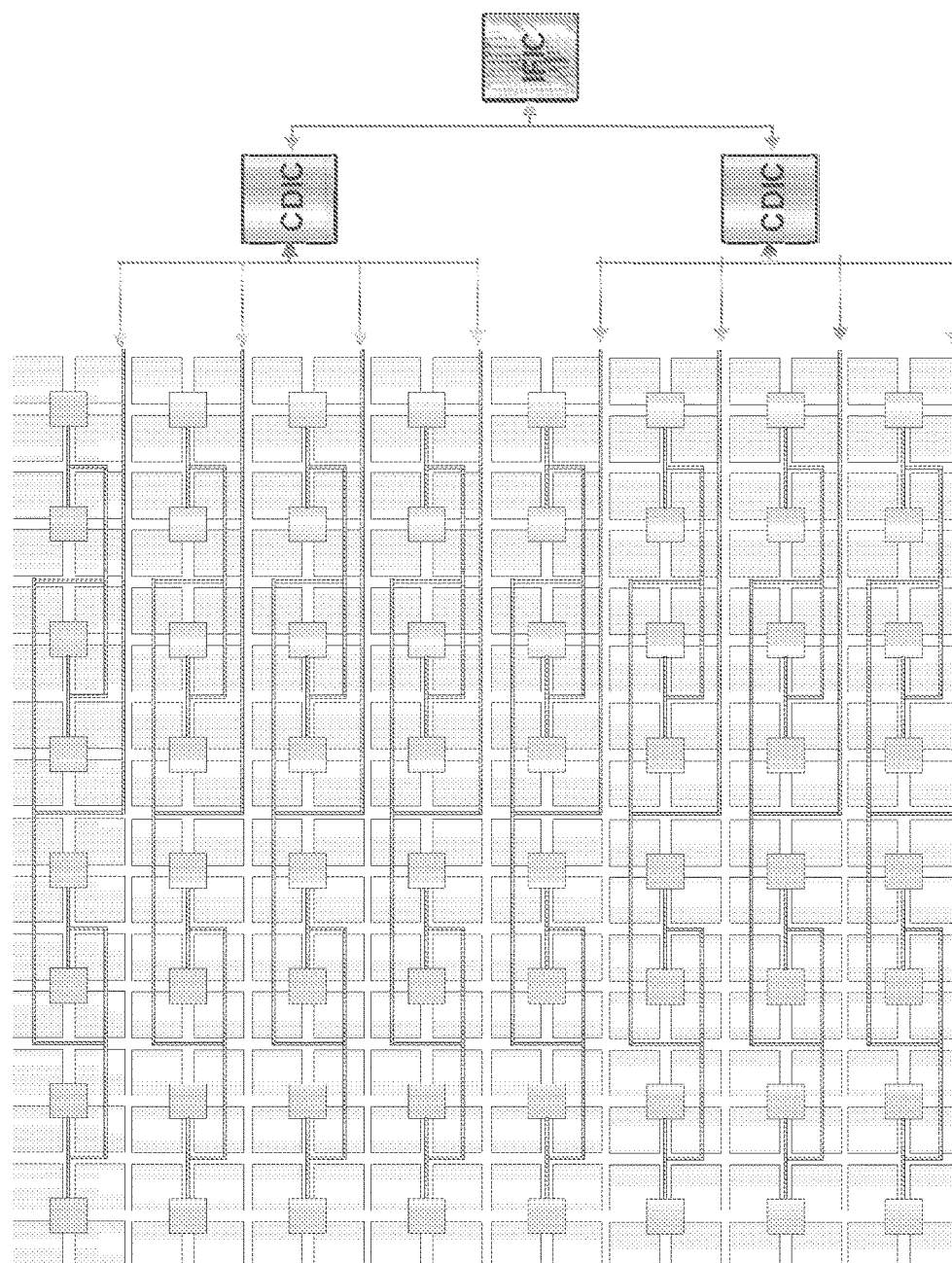
FIG. 23 is a schematic diagram showing a 256-element sub-array in a "side-fired" arrangement, in accordance with certain exemplary embodiments.

FIG. 23 is a schematic diagram showing a 256-element sub-array in a "side-fired" arrangement, in accordance with certain exemplary embodiments. Here, each BFIC chip supports a set of four beam forming elements (i.e., 64 BFIC chips), each CDIC chip aggregates signals to/from a set of 32 BFIC chips, and the IFIC chip aggregates signals to/from the two CDIC chips.

Thus, one exemplary embodiment is a chipset including a BFIC chip, a CDIC chip, and an IFIC chip that can be used in various combinations in order to provide various array and sub-array configurations.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A conditioning integrated circuit for use in a phase array system, the conditioning integrated circuit comprising:
a plurality of beam forming channels, each beam forming channel including a transmit circuit and a receive circuit;
a common port coupled to the beam forming channels for selectively providing a common transmit signal to the beam forming channels and receiving a common receive signal from the beam forming channels; and
a temperature compensation circuit configured to provide variable attenuation to the common transmit signal and the common receive signal based on a temperature sense signal.

P2. The conditioning integrated circuit of claim P1, wherein the temperature compensation circuit comprises:
a temperature sensor configured to provide the temperature sense signal;
a transmit variable attenuator configured to provide variable attenuation to the common transmit signal based on the temperature sense signal; and
a receive variable attenuator configured to provide variable attenuation to the common receive signal based on the temperature sense signal.

P3. The conditioning integrated circuit of claim P2, wherein the variable attenuators are digital attenuators.

P4. The conditioning integrated circuit of claim P1, wherein each receive circuit includes a first switchable path including phase/gain control circuitry and a second switchable path bypassing the phase/gain control circuitry.

P5. The conditioning integrated circuit of claim P1, wherein the common port includes a switch for selectively coupling the common transmit signal or the common receive signal to a common signal interface.

P6. The conditioning integrated circuit of claim P1, wherein the common port includes separate transmit and receive signal interfaces, the transmit signal interface providing the common transmit signal from an external device to the beam forming channels, the receive signal interface providing the common receive signal from the beam forming channels to the external device.

P7. The conditioning integrated circuit of claim P1, comprising exactly two beam forming channels.

P8. The conditioning integrated circuit of claim P1, comprising exactly four beam forming channels.

P9. A sub-array comprising:
a plurality of beam forming elements;
a plurality of beam forming integrated circuits, each beam forming integrated circuit coupled to a distinct set of the beam forming elements; and
a conditioning integrated circuit according to any of claims P1-P8 coupled to the plurality of beam forming integrated circuits, the conditioning integrated circuit aggregating beam forming signals to and from the plurality of beam forming integrated circuits.

P10. The sub-array of claim P9, wherein each beam forming integrated circuit includes a temperature compensation circuit, and wherein conditioning integrated circuit is configured to form a greater amount of temperature compensation than the plurality of beam forming integrated circuits so as to increase efficiency of the phased array system.

P11. The sub-array according to claim P9, further comprising:
an interface integrated circuit having an integral up/down converter and coupled to the conditioning integrated circuit.

P12. A phased array system comprising a plurality of sub-arrays according to any of claims P9 or P10.

P13. The phased array system of claim P12, further comprising:
an interface integrated circuit having an integral up/down converter and coupled to at least two of the sub-array conditioning integrated circuits.

P14. The phased array system according to claim P12, further comprising:
an additional conditioning integrated circuit according to any of claims P1-P8 and configured to aggregated signals to and from the sub-array conditioning integrated circuits.

P15. The phased array system according to claim P14, further comprising:
an interface integrated circuit having an integral up/down converter and coupled to the additional conditioning integrated circuit.

Although the above discussion discloses various exemplary embodiments of the invention, it should be apparent that those skilled in the art can make various modifications that will achieve some of the advantages of the invention without departing from the true scope of the invention.

What is claimed is:

1. A conditioning integrated circuit for use with a plurality of beam forming integrated circuits in a phase array system, the conditioning integrated circuit comprising:
a plurality of beam forming channels, each beam forming channel including a transmit circuit configured to provide a transmit signal to at least one of the plurality of beam forming integrated circuits based on a common transmit signal and a receive circuit configured to provide an output signal based on temperature-compensated signals from at least one of the plurality of beam forming integrated circuits;
a common port coupled to the beam forming channels for selectively providing the common transmit signal to the beam forming channels and receiving a common receive signal based on the output signals from the beam forming channels; and
a temperature compensation circuit configured to perform temperature-based variable gain compensation to the common receive signal based on a temperature sense signal to compensate for residual gain variation over temperature remaining after the beam forming integrated circuits.

2. A conditioning integrated circuit according to claim 1, wherein the conditioning integrated circuit is configured to operate in a dual pole manner.

3. A conditioning integrated circuit according to claim 1, wherein the conditioning integrated circuit comprises:
a temperature sensor configured to provide the temperature sense signal;
a transmit variable attenuator configured to provide variable attenuation to the common transmit signal based on the temperature sense signal; and
a receive variable attenuator configured to provide variable attenuation to the common receive signal based on the temperature sense signal.

4. A conditioning integrated circuit according to claim 3, wherein the variable attenuators are digital attenuators.

5. A conditioning integrated circuit according to claim 1, wherein each receive circuit includes a first switchable path including phase/gain control circuitry and a second switchable path bypassing the phase/gain control circuitry.

6. A conditioning integrated circuit according to claim 1, wherein the common port includes a switch for selectively coupling the common transmit signal or the common receive signal to a common signal interface.

7. A conditioning integrated circuit according to claim 1, wherein the common port includes separate transmit and receive signal interfaces, the transmit signal interface providing the common transmit signal from an external device to the beam forming channels, the receive signal interface providing the common receive signal from the beam forming channels to the external device.

8. A conditioning integrated circuit according to claim 1, wherein the conditioning integrated circuit comprises exactly two beam forming channels.

9. A conditioning integrated circuit according to claim 1, wherein the conditioning integrated circuit comprises exactly four beam forming channels.

10. A phased array system comprising:
    a plurality of beam forming integrated circuits, each beam forming integrated circuit couplable to a distinct set of beam forming elements; and
    a conditioning integrated circuit coupled to the plurality of beam forming integrated circuits and configured to aggregate beam forming signals to and from the plurality of beam forming integrated circuits, the conditioning integrated circuit comprising:
    a plurality of beam forming channels, each beam forming channel including a transmit circuit configured to provide a transmit signal to at least one of the plurality of beam forming integrated circuits based on a common transmit signal and a receive circuit configured to provide an output signal based on temperature-compensated signals from at least one of the plurality of beam forming integrated circuits;
    a common port coupled to the beam forming channels for selectively providing the common transmit signal to the beam forming channels and receiving a common receive signal based on the output signals from the beam forming channels; and
    a temperature compensation circuit configured to perform temperature-based variable gain compensation to the common receive signal based on a temperature sense signal to compensate for residual gain variation over temperature remaining after the beam forming integrated circuits.

11. A system according to claim 10, further comprising a plurality of beam forming elements.

12. A system according to claim 10, wherein the conditioning integrated circuit is configured to operate in a dual pole manner.

13. A system according to claim 10, wherein the conditioning integrated circuit comprises:
    a temperature sensor configured to provide the temperature sense signal;
    a transmit variable attenuator configured to provide variable attenuation to the common transmit signal based on the temperature sense signal; and
    a receive variable attenuator configured to provide variable attenuation to the common receive signal based on the temperature sense signal.

14. A system according to claim 13, wherein the variable attenuators are digital attenuators.

15. A system according to claim 10, wherein each receive circuit includes a first switchable path including phase/gain control circuitry and a second switchable path bypassing the phase/gain control circuitry.

16. A system according to claim 10, wherein the common port includes a switch for selectively coupling the common transmit signal or the common receive signal to a common signal interface.

17. A system according to claim 10, wherein the common port includes separate transmit and receive signal interfaces, the transmit signal interface providing the common transmit signal from an external device to the beam forming channels, the receive signal interface providing the common receive signal from the beam forming channels to the external device.

18. A system according to claim 10, wherein the conditioning integrated circuit comprises exactly two beam forming channels.

19. A system according to claim 10, wherein the conditioning integrated circuit comprises exactly four beam forming channels.

20. A system according to claim 10, further comprising:
    a controller configured to control a distribution of temperature compensation between at least the beam forming integrated circuits and the conditioning integrated circuit to provide a predetermined amount of temperature-based gain compensation while substantially optimizing efficiency across the phased array system.

* * * * *